United States Patent
Levitsky et al.

(10) Patent No.: US 11,996,948 B2
(45) Date of Patent: May 28, 2024

(54) HIERARCHICAL HYBRID AUTOMATIC REPEAT REQUEST ACROSS DIFFERENT DECODING LEVELS

(71) Applicant: QUALCOMM Incorporated, San Diego, CA (US)

(72) Inventors: Michael Levitsky, Rehovot (IL); Assaf Touboul, Netanya (IL); Daniel Paz, Tirat Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/351,877

(22) Filed: Jun. 18, 2021

(65) Prior Publication Data

US 2022/0014316 A1    Jan. 13, 2022

Related U.S. Application Data

(60) Provisional application No. 63/049,827, filed on Jul. 9, 2020.

(51) Int. Cl.
*H04L 1/00* (2006.01)
*H04L 1/06* (2006.01)
(Continued)

(52) U.S. Cl.
CPC .......... *H04L 1/1819* (2013.01); *H04L 1/0643* (2013.01); *H04L 1/189* (2013.01); *H04L 1/1896* (2013.01)

(58) Field of Classification Search
None
See application file for complete search history.

(56) References Cited

U.S. PATENT DOCUMENTS

| | | | |
|---|---|---|---|
| 2009/0313520 A1* | 12/2009 | Chung | H03M 13/6393 714/751 |
| 2015/0139109 A1* | 5/2015 | Seo | H04W 72/23 370/329 |

(Continued)

FOREIGN PATENT DOCUMENTS

| | | |
|---|---|---|
| EP | 2222100 A1 | 8/2010 |
| JP | 5135603 B2 | 2/2013 |

OTHER PUBLICATIONS

International Search Report and Written Opinion—PCT/US2021/038188—ISA/EPO—dated Oct. 5, 2021.

*Primary Examiner* — Brandon M Renner
(74) *Attorney, Agent, or Firm* — Holland & Hart LLP

(57) ABSTRACT

Methods, systems, and devices for wireless communications are described. One method may include a user equipment (UE) receiving, in a first transmission time interval, a code block group including a set of code blocks associated with a set of codewords, each codeword being associated with one of a set of decoding levels introduced in communication scheme that uses multi-level coded modulation and multi-level sequential decoding. The UE may determine that a decoding procedure is unsuccessful, and transmit a feedback message including a first indicator that the decoding procedure was unsuccessful and a second indicator of a lowest decoding level for which the decoding procedure was unsuccessful. The UE may then receive, from the base station in a second transmission time interval, a retransmission of code blocks of the lowest failed decoding level coupled to a new data transmission for code blocks associated with all other decoding levels.

30 Claims, 18 Drawing Sheets

(51) Int. Cl.
*H04L 1/1812* (2023.01)
*H04L 1/1867* (2023.01)

(56) References Cited

U.S. PATENT DOCUMENTS

| | | | |
|---|---|---|---|
| 2017/0223670 A1* | 8/2017 | Chen | H04L 5/0053 |
| 2018/0270022 A1* | 9/2018 | Sun | H04L 1/0061 |
| 2018/0375634 A1* | 12/2018 | Sun | H04L 1/0023 |
| 2020/0259600 A1* | 8/2020 | Cao | H04L 1/0065 |
| 2020/0304246 A1* | 9/2020 | Ahn | H04L 1/0041 |
| 2021/0120537 A1* | 4/2021 | Lei | H04L 1/1893 |
| 2022/0116147 A1* | 4/2022 | Hou | H04L 5/0055 |

* cited by examiner

Uplink Control Signaling

HIERARCHICAL HYBRID AUTOMATIC REPEAT REQUEST ACROSS DIFFERENT DECODING LEVELS

CROSS REFERENCE

The present Application for Patent claims the benefit of U.S. Provisional Patent Application No. 63/049,827 by LEVITSKY et al., entitled "HIERARCHICAL HYBRID AUTOMATIC REPEAT REQUEST ACROSS DIFFERENT DECODING LEVELS," filed Jul. 9, 2020, assigned to the assignee hereof, and expressly incorporated by reference herein.

FIELD OF TECHNOLOGY

The present disclosure relates generally to wireless communications and more specifically to hierarchical hybrid automatic repeat request (HARQ) across different decoding levels for communication system employing multi-level coding (MLC) on the transmitter side and multi-level sequential demodulation and decoding (MSD) on the receiver side.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Information transmitted between network nodes may be encoded to improve the reliability of the transmitted information. For example, a coding scheme may provide redundancy, which may be used to correct errors that result from the transmission environment. Some wireless communications systems may use multi-level coding and multi-level sequential demodulation and decoding to improve spectral efficiency. Using multi-level coding with multi-level sequential demodulation and decoding creates a dependency between high and low level decoding levels. For example, if codeword (or associated code blocks) that correspond to a low decoding level fail a cyclic redundancy check (CRC), the higher decoding level codeword (or corresponding code blocks) will fail as well. In some cases, multi-level coding techniques may lead to inefficiency and increased overhead related to HARQ retransmissions in wireless communications systems.

SUMMARY

The described techniques relate to improved methods, systems, devices, and apparatuses that support hierarchical hybrid automatic repeat request (HARQ) across different decoding levels. Generally, the described techniques provide for a hierarchical HARQ procedure across different decoding levels in systems using multi-level coding and multi-level sequential demodulation and decoding. One such procedure may include a user equipment (UE) receiving a code block group (CBG) from a base station which includes one or more code blocks associated with codewords associated with one or more decoding levels. The UE may determine that a decoding procedure associated with one or more of the codewords (or corresponding code blocks) is unsuccessful. Accordingly, the UE may transmit a feedback message to the base station indicating that the decoding procedure was unsuccessful and indicating a lowest decoding level for which the decoding procedure was unsuccessful. In response, the base station may hierarchically and selectively retransmit codewords (or the corresponding code blocks) associated with the lowest failing decoding level according to the feedback message received from the UE. Retransmission of the lowest failing decoding level may be performed coupled to a new data transmission on all the remaining decoding levels. Once the lowest failing decoding level is successfully decoded after a retransmission, a subset partition data used for decoding of all the higher decoding levels for all the previous transmission intervals associated with the retransmissions of the lower decoding level will be available at the receiver and may be used for decoding of all the higher decoding levels for transmissions from the previous time intervals that were put on hold during hierarchical HARQ retransmissions.

A method of wireless communication at a UE is described. The method may include receiving, from a base station in a first transmission time interval, a code block group including a set of code blocks associated with a set of codewords, each codeword of the set of codewords associated with one of a set of decoding levels of a decoding procedure for the code block group, determining that the decoding procedure associated with one or more code blocks of the set of code blocks included in the code block group and associated with codewords of the set of codewords is unsuccessful, transmitting, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels, and receiving, from the base station in a second transmission time interval and based on the transmitted feedback message, a retransmission of code blocks included in the failed code block group and corresponding to a codeword of the lowest failing decoding level.

An apparatus for wireless communication at a UE is described. The apparatus may include a processor, memory coupled with the processor, and instructions stored in the memory. The instructions may be executable by the processor to cause the apparatus to receive, from a base station in a first transmission time interval, a code block group including a set of code blocks associated with a set of codewords, each codeword of the set of codewords associated with one of a set of decoding levels of a decoding procedure for the code block group, determine that the decoding procedure associated with one or more code blocks of the set of code blocks included in the code block group and associated with codewords of the set of codewords is unsuccessful, transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels, and receive, from the base station in a second transmission time interval and based on the transmitted feedback message, a retransmission of code blocks included in the failed code block group and corresponding to a codeword of the lowest failing decoding level.

Another apparatus for wireless communication at a UE is described. The apparatus may include means for receiving, from a base station in a first transmission time interval, a code block group including a set of code blocks associated with a set of codewords, each codeword of the set of codewords associated with one of a set of decoding levels of a decoding procedure for the code block group, determining that the decoding procedure associated with one or more code blocks of the set of code blocks included in the code block group and associated with codewords of the set of codewords is unsuccessful, transmitting, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels, and receiving, from the base station in a second transmission time interval and based on the transmitted feedback message, a retransmission of code blocks included in the failed code block group and corresponding to a codeword of the lowest failing decoding level.

A non-transitory computer-readable medium storing code for wireless communication at a UE is described. The code may include instructions executable by a processor to receive, from a base station in a first transmission time interval, a code block group including a set of code blocks associated with a set of codewords, each codeword of the set of codewords associated with one of a set of decoding levels of a decoding procedure for the code block group, determine that the decoding procedure associated with one or more code blocks of the set of code blocks included in the code block group and associated with codewords of the set of codewords is unsuccessful, transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels, and receive, from the base station in a second transmission time interval and based on the transmitted feedback message, a retransmission of code blocks included in the failed code block group and corresponding to a codeword of the lowest failing decoding level.

Some examples of the method, apparatuses, and non-transitory computer-readable medium described herein may further include operations, features, means, or instructions for determining that a decoding procedure of one or more code blocks associated with a first codeword may be successful and a decoding procedure of one or more code blocks associated with a second codeword may be unsuccessful, where the first codeword may be associated with a the first and lower decoding level of the set of decoding levels and the second codeword may be associated with the second and higher decoding level.

Some examples of the method, apparatuses, and non-transitory computer-readable medium described herein may further include operations, features, means, or instructions for receiving, from the base station, a control message responsive to the feedback message including the second indicator indicating that the decoding procedure associated with the second codeword may be unsuccessful, the control message including a retransmission indicator for the corresponding code blocks associated with the second decoding level and a new data indicator, where the new data indicator may be associated with one or more decoding levels lower than the second decoding level.

Some examples of the method, apparatuses, and non-transitory computer-readable medium described herein may further include operations, features, means, or instructions for determining that the new data indicator includes an indication of a third codeword associated with the first decoding level, receiving, from the base station and in the second transmission time interval, code blocks associated with the third codeword based on the decoding procedure associated with the first codeword being successful in the first transmission time interval, and transmitting, to the base station, a second feedback message indicating that a decoding procedure associated with the third codeword and corresponding to it code blocks may be successful.

Some examples of the method, apparatuses, and non-transitory computer-readable medium described herein may further include operations, features, means, or instructions for determining that the retransmission indicator includes a hybrid automatic repeat request process number and a redundancy version associated with the second codeword, where receiving the retransmission of the codeword of the second decoding level includes receiving retransmission of the corresponding code blocks of the second codeword.

In some examples of the method, apparatuses, and non-transitory computer-readable medium described herein, the control message includes a downlink control information.

Some examples of the method, apparatuses, and non-transitory computer-readable medium described herein may further include operations, features, means, or instructions for storing a log likelihood ratio associated with the code blocks related to codeword of the lowest failing decoding level and a hybrid automatic repeat request process identifier, and an indication associated with the decoding level for which the decoding procedure was unsuccessful.

Some examples of the method, apparatuses, and non-transitory computer-readable medium described herein may further include operations, features, means, or instructions for decoding, in the second transmission time interval and based on receiving the retransmission of the code blocks related to codeword of the lowest failing decoding level, and decoding of the code blocks of the lowest failing decoding level using the stored log likelihood ratio, and transmitting, to the base station, a second feedback message indicating that a decoding procedure associated with the retransmission of the corresponding code blocks related to the codeword of the lowest failing decoding level may be successful after the retransmission.

Some examples of the method, apparatuses, and non-transitory computer-readable medium described herein may further include operations, features, means, or instructions for determining that a decoding procedure associated with the corresponding code blocks of a first codeword may be unsuccessful, storing one or more post processing samples associated with the code blocks of a second codeword based on determining that the decoding procedure associated with the first codeword may be unsuccessful, and deferring a decoding procedure associated with the corresponding code blocks of the second codeword, where the first codeword may be associated with the lowest failing decoding level of the set of decoding levels and the second one or more codewords may be associated with a second and higher decoding level of the set of decoding levels.

Some examples of the method, apparatuses, and non-transitory computer-readable medium described herein may further include operations, features, means, or instructions for storing a log likelihood ratios associated with the corresponding code blocks related to the first codeword based on determining that the decoding procedure associated with the first codeword may be unsuccessful, where receiving the retransmission of the corresponding code blocks of the codeword of the lowest failing decoding level includes receiving the retransmission of the corresponding code blocks of the first codeword, and successfully decoding the retransmitted code blocks of the first codeword based on the stored log likelihood ratios and retransmissions.

Some examples of the method, apparatuses, and non-transitory computer-readable medium described herein may further include operations, features, means, or instructions for receiving, from the base station, a control message responsive to the feedback message including the second indicator indicating that the decoding procedure associated with the first codeword may be unsuccessful, the control message including a retransmission indicator and a new data indicator.

Some examples of the method, apparatuses, and non-transitory computer-readable medium described herein may further include operations, features, means, or instructions for determining that the new data indicator includes an indication of a third codeword associated with the second decoding level, and receiving, from the base station and in the second transmission time interval, the third codeword and associated code blocks.

Some examples of the method, apparatuses, and non-transitory computer-readable medium described herein may further include operations, features, means, or instructions for decoding, the corresponding code blocks related to the second codeword from the first transmission time interval based on a corresponding stored post processing sample and decoded partition information associated with the corresponding code blocks related to the first codeword, and decoding, in the second transmission time interval, the code blocks related to the third codeword based on receiving the third codeword and decoding the retransmission of the corresponding code blocks related to the first codeword on the second time interval based on the decoded partition information associated with the corresponding code blocks related to the first codeword.

Some examples of the method, apparatuses, and non-transitory computer-readable medium described herein may further include operations, features, means, or instructions for setting one or more bits associated with the second indicator of the decoding level, where a value of the one or more bits identifies the lowest decoding level associated with the code blocks for which the decoding procedure was unsuccessful.

In some examples of the method, apparatuses, and non-transitory computer-readable medium described herein, the one or more bits include one bit that may be set to indicate the lowest decoding level of the set of decoding levels, where the set of decoding levels include two decoding levels.

In some examples of the method, apparatuses, and non-transitory computer-readable medium described herein, the one or more bits include two or more bits that may be set to indicate the lowest decoding level of the set of decoding levels, where the set of decoding levels include three or more decoding levels.

Some examples of the method, apparatuses, and non-transitory computer-readable medium described herein may further include operations, features, means, or instructions for transmitting, to the base station, an indication of a capability of the UE to support hierarchical acknowledgement feedback and a number of hybrid automatic repeat request processes across the set of decoding levels, where receiving the retransmission of the codewords of the lowest failing decoding level and new codewords associated with all other decoding levels may be based on the capability of the UE.

Some examples of the method, apparatuses, and non-transitory computer-readable medium described herein may further include operations, features, means, or instructions for transmitting, to the base station, an indication of a capability of the UE to support a maximum number of hierarchical hybrid automatic repeat request buffers associated with the number of hybrid automatic repeat request processes.

In some examples of the method, apparatuses, and non-transitory computer-readable medium described herein, the retransmission of codewords of the lowest failing decoding level includes retransmission of all the corresponding code blocks related to the lowest failing decoding level, where the corresponding code blocks may be included in the corresponding code blocks group.

In some examples of the method, apparatuses, and non-transitory computer-readable medium described herein, the UE may be configured to support multi-level coding with a multi-level sequential demodulation and decoding scheme.

In some examples of the method, apparatuses, and non-transitory computer-readable medium described herein, the first transmission time interval includes a first subframe or a first slot, and the second transmission time interval includes a second subframe or a second slot.

A method of wireless communication at a base station is described. The method may include transmitting, to a UE and in a first transmission time interval, a code block group including a set of code blocks associated with a set of codewords, each codeword of the set of codewords associated with one of a set of decoding levels of a decoding procedure for the code block group, receiving, from the UE, a feedback message including a first indicator that a decoding procedure was unsuccessful for the code block group and a second indicator of a lowest decoding level of the one or more codewords for which the decoding procedure was unsuccessful, the lowest decoding level being one of the set of decoding levels, and transmitting, to the UE in a second transmission time interval and based on the received feedback message, a retransmission of the corresponding code blocks included in the failed code block group and corresponding to the codeword of the lowest failing decoding level.

An apparatus for wireless communication at a base station is described. The apparatus may include a processor, memory coupled with the processor, and instructions stored in the memory. The instructions may be executable by the processor to cause the apparatus to transmit, to a UE and in a first transmission time interval, a code block group including a set of code blocks associated with a set of codewords, each codeword of the set of codewords associated with one of a set of decoding levels of a decoding procedure for the code block group, receive, from the UE, a feedback message including a first indicator that a decoding procedure was unsuccessful for the code block group and a second indicator of a lowest decoding level of the one or more codewords for which the decoding procedure was unsuccessful, the lowest decoding level being one of the set of decoding levels, and transmit, to the UE in a second transmission time interval and based on the received feedback message, a retransmission of the corresponding code blocks included in the failed code block group and corresponding to the codeword of the lowest failing decoding level.

Another apparatus for wireless communication at a base station is described. The apparatus may include means for transmitting, to a UE and in a first transmission time interval, a code block group including a set of code blocks associated with a set of codewords, each codeword of the set of codewords associated with one of a set of decoding levels of a decoding procedure for the code block group, receiving, from the UE, a feedback message including a first indicator that a decoding procedure was unsuccessful for the code block group and a second indicator of a lowest decoding level of the one or more codewords for which the decoding procedure was unsuccessful, the lowest decoding level being one of the set of decoding levels, and transmitting, to the UE in a second transmission time interval and based on the received feedback message, a retransmission of the corresponding code blocks included in the failed code block group and corresponding to the codeword of the lowest failing decoding level.

A non-transitory computer-readable medium storing code for wireless communication at a base station is described. The code may include instructions executable by a processor to transmit, to a UE and in a first transmission time interval, a code block group including a set of code blocks associated with a set of codewords, each codeword of the set of codewords associated with one of a set of decoding levels of a decoding procedure for the code block group, receive, from the UE, a feedback message including a first indicator that a decoding procedure was unsuccessful for the code block group and a second indicator of a lowest decoding level of the one or more codewords for which the decoding procedure was unsuccessful, the lowest decoding level being one of the set of decoding levels, and transmit, to the UE in a second transmission time interval and based on the received feedback message, a retransmission of the corresponding code blocks included in the failed code block group and corresponding to the codeword of the lowest failing decoding level.

Some examples of the method, apparatuses, and non-transitory computer-readable medium described herein may further include operations, features, means, or instructions for determining that a decoding procedure of one or more code blocks associated with a first codeword may be successful and a decoding procedure of one or more code blocks associated with a second codeword may be unsuccessful, where the first codeword may be associated with a first and lower decoding level of the set of decoding levels and the second codeword may be associated with the second and higher decoding level of the set of decoding levels.

Some examples of the method, apparatuses, and non-transitory computer-readable medium described herein may further include operations, features, means, or instructions for transmitting, to the UE, a control message responsive to the feedback message including the second indicator indicating that the decoding procedure associated with the second codeword may be unsuccessful, the control message including a retransmission indicator for the corresponding code blocks associated with the second decoding level and a new data indicator, where the new data indicator may be associated with one or more decoding levels lower than the second decoding level.

Some examples of the method, apparatuses, and non-transitory computer-readable medium described herein may further include operations, features, means, or instructions for transmitting, to the UE and in the second transmission time interval, code blocks associated with a third codeword based on the decoding procedure associated with the first codeword being successful in the first transmission time interval, where the new data indicator includes an indication of the third codeword associated with the first decoding level and the corresponding to it code blocks, and receiving, from the UE, a second feedback message indicating that a decoding procedure associated with the third codeword may be successful.

Some examples of the method, apparatuses, and non-transitory computer-readable medium described herein may further include operations, features, means, or instructions for including a hybrid automatic repeat request process number and a redundancy version associated with the second codeword in the retransmission indicator, where transmitting the retransmission of the codeword of the lowest failing decoding level includes transmitting retransmission of the corresponding code blocks of the second codeword.

In some examples of the method, apparatuses, and non-transitory computer-readable medium described herein, the control message includes a downlink control information.

Some examples of the method, apparatuses, and non-transitory computer-readable medium described herein may further include operations, features, means, or instructions for determining that a decoding procedure associated with the corresponding code blocks of a first codeword may be unsuccessful, where the first codeword may be associated with the lowest failing decoding level of the set of decoding levels, and transmitting, to the UE, a control message responsive to the feedback message including the second indicator indicating that the decoding procedure associated with the code blocks corresponding to the codeword of the lowest failing decoding level may be unsuccessful, the control message including a retransmission indicator and a new data indicator, where the retransmission indicator indicates the retransmission of the corresponding code blocks associated with the first codeword and the new data indicator includes an indication of a third codeword and corresponding to it code blocks associated with a second decoding level.

Some examples of the method, apparatuses, and non-transitory computer-readable medium described herein may further include operations, features, means, or instructions for receiving, from the UE, an indication of a capability of the UE to support hierarchical acknowledgement feedback and a number of hybrid automatic repeat request processes across the set of decoding levels, where transmitting the retransmission of the codewords of the lowest failing decoding level and new codewords associated with all the other decoding levels may be based on the capability of the UE.

Some examples of the method, apparatuses, and non-transitory computer-readable medium described herein may further include operations, features, means, or instructions for receiving, from the UE, an indication of a capability of the UE to support a maximum number of hierarchical hybrid automatic repeat request buffers associated with the number of hybrid automatic repeat request processes.

In some examples of the method, apparatuses, and non-transitory computer-readable medium described herein, the retransmission of codewords of the lowest failing decoding level includes retransmission of all the corresponding code blocks associated with a codeword of the lowest failing decoding level, where the corresponding code blocks may be included in the corresponding code blocks group.

In some examples of the method, apparatuses, and non-transitory computer-readable medium described herein, the base station may be configured to support multi-level coding.

In some examples of the method, apparatuses, and non-transitory computer-readable medium described herein, the first transmission time interval includes a first subframe or a first slot, and the second transmission time interval includes a second subframe or a second slot.

DETAILED DESCRIPTION

Figure 1:
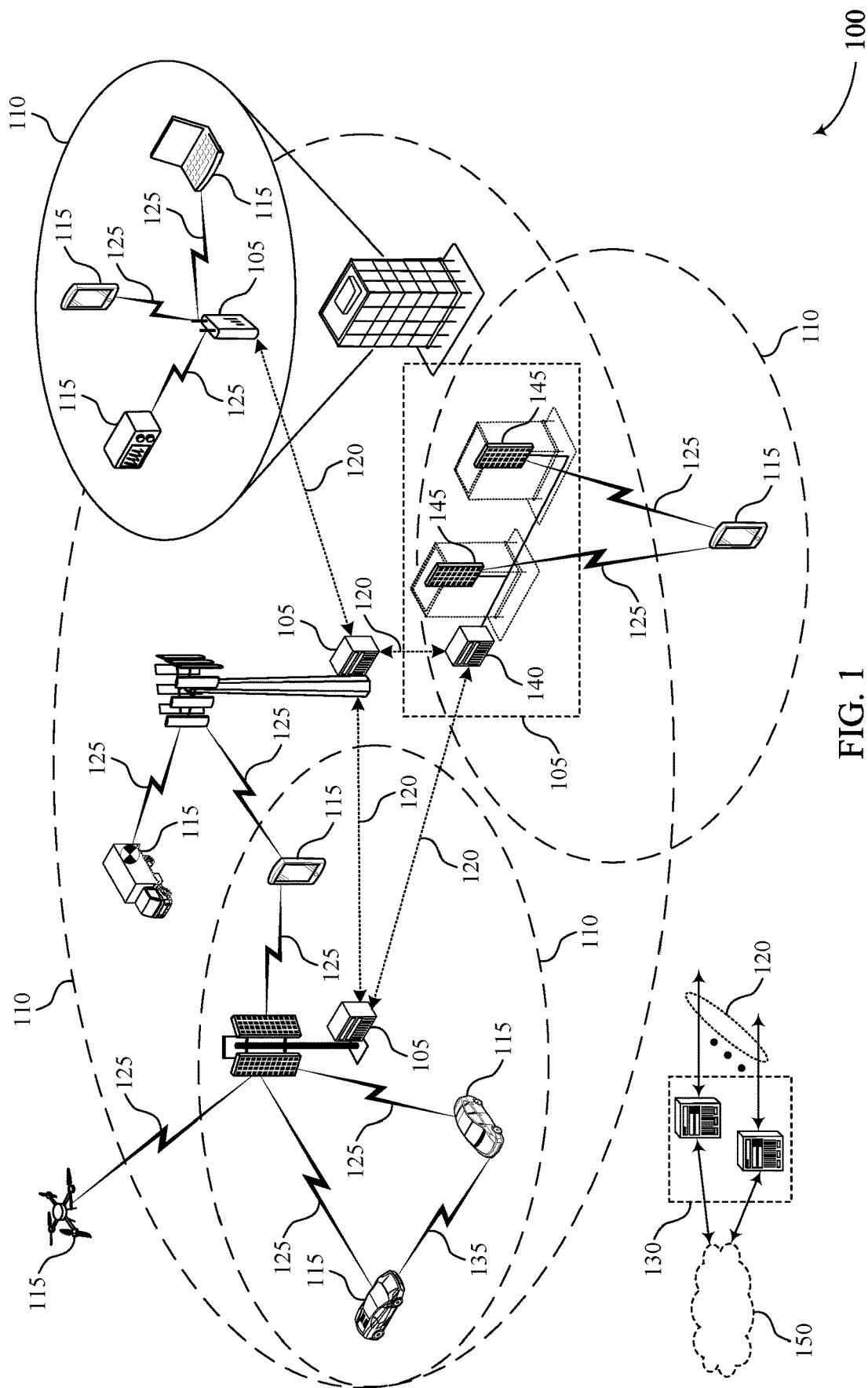
FIG. 1 illustrates an example of a system for wireless communications that supports hierarchical hybrid automatic repeat request (HARQ) across different decoding levels in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. In some wireless communications systems, a network node (e.g., a user equipment (UE), a base station, or another wireless device) may employ encoding of source information (e.g., data packets) to improve the reliability with which a destination node may recover the original source information. Some wireless communications system use multi-level coding with multi-level sequential demodulation and decoding to improve spectral efficiency. In some cases of multi-level coding, a receiving device may decode each codeword (or corresponding code blocks) of a decoding level based on code-protected partitioning information originating from one or more corresponding codewords (or code blocks) associated with the lower decoding levels. In some cases, decoding a level may be dependent on a successful decoding of a previous level. For example, if a device (e.g., UE) fails to accurately decode a codeword (or corresponding code blocks) associated with a first (e.g., lower) decoding level (e.g., fails a cyclic redundancy check (CRC)), then the device may fail to decode a codeword (or corresponding code blocks) associated with a second (e.g., higher) decoding level. In some cases, such a decoding level dependency may lead to error propagation.

In some wireless communications systems, a code block group (CBG) may include code blocks or codewords associated with different decoding levels. In such cases, the error propagation generated from decoding level dependency may lead to inefficiencies in hybrid automatic repeat request (HARQ) procedures. It may be beneficial to introduce a hierarchical HARQ procedure that allows for a gradual retransmission of different decoding levels based on a decoding result of a lowest decoding level (e.g., a lowest decoding level that fails a CRC).

One or more aspects of the present disclosure provide for a method for implementing a hierarchical HARQ procedure. A transmitting device (e.g., base station) may transmit a CBG spanning a set of resource elements (REs). In some cases, the CBG may be associated with different decoding levels that span a common portion of transmitted REs. More specifically, the CBG may include one or more code blocks of a first codeword (or a set of codewords) mapped to a first decoding level and one or more code blocks of a second codeword (or a set of codewords) mapped to a second decoding level. A receiving device (e.g., UE) may receive the transmitted CBG and may attempt to decode one or more code blocks of the included codewords. In some cases, decoding one or more code blocks of the transmitted codewords may include performing a CRC. Based on an outcome of the CRC, the receiving device may transmit either a positive acknowledgement (ACK) message or a negative acknowledgement (NACK) message. For instance, if the receiving device (e.g., UE) determines that code blocks of all codewords of the CBG have passed the CRC, the receiving device may transmit an ACK message for that CBG. Alternatively, if the receiving device determines that at least one codeword (or code block) has failed to pass the CRC, the receiving device may identify a lowest decoding level associated with the at least one codeword failing to pass the CRC. Upon identifying the lowest decoding level, the receiving device may transmit a NACK message for the CBG and an indication of the lowest decoding level. In one example, the CBG may include codewords mapped to two decoding levels, a higher decoding level and a lower decoding level. The receiving device may attempt to decode one or more code blocks of the codewords associated with the lower decoding level and may perform a CRC. If one of the codewords (or code blocks) associated with the lower decoding level fails the CRC, the receiving device may not attempt to decode the higher level codewords (or corresponding code blocks sharing the same channel resources).

In such cases, the receiving device may store samples associated with the codewords (or corresponding code blocks) mapped to the higher decoding level, and may transmit a NACK message for the CBG and an indication of the lowest failing decoding level for this CBG.

In response to receiving the NACK message, the transmitting device may determine a set of codewords/code blocks to retransmit. In some examples, the transmitting device may retransmit code blocks of the lower decoding level that the receiving device has failed to decode. The transmitting device may also transmit a new set of code blocks associated with decoding levels for which the device did not attempt decoding. In accordance with the example discussed above, the transmitting device may retransmit the code blocks of the lower decoding level and may transmit a new set of code blocks (e.g., set of codewords including new data) associated with the higher decoding level. In some cases, retransmitting the code blocks may include transmitting another redundancy version (or repetition) associated with the codeword. The receiving device may receive the transmission and may attempt to decode the code blocks associated with a lower level codeword using a HARQ combining procedure.

Implementing various aspects of this disclosure may allow for a hierarchical HARQ procedure where codewords or corresponding code blocks are gradually (e.g., hierarchically, in a number of steps) retransmitted upon an unsuccessful decoding procedure. Gradually retransmitting codewords may decrease the number of codewords that are retransmitted during HARQ procedures. Additionally or alternatively, decreasing the number of retransmitted codewords may increase system efficiency and decrease communications overhead in communications systems. UEs capable of supporting the hierarchical HARQ procedure may utilize the techniques described herein to experience power saving, such as reduced power consumption and extended battery life while ensuring reliable and efficient communications between UEs and base stations, among other benefits. Particular aspects of the subject matter described in this disclosure may be implemented to realize one or more of the following potential advantages. The techniques employed by the described UEs may provide benefits and enhancements in a wireless link. For example, operations performed by the UEs may provide improvements in a UE link efficiency. The described techniques may thus include features for improvements to power consumption, spectral efficiency, higher data rates and, in some examples, with some modifications may provide reduced latency operation, among other benefits during retransmission events with multi-level coding and multi-level sequential decoding employed by the communication system.

Aspects of the disclosure are initially described in the context of wireless communications systems. Aspects of the disclosure are further described in the context of a coding scheme, processing timelines, and a process flow. Aspects of the disclosure are further illustrated by and described with reference to apparatus diagrams, system diagrams, and flowcharts that relate to hierarchical HARQ across different decoding levels.

FIG. 1 illustrates an example of a wireless communications system 100 that supports hierarchical HARQ across different decoding levels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may include one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a network node (e.g., a UE 115, a base station 105, or another wireless device) may employ encoding of source information (e.g., data packets) to improve the reliability with which a destination node may recover the original source information. In some cases, the wireless communications system 100 may use multi-level coding with multi-level sequential demodulation and decoding to improve spectral efficiency. In some cases of multi-level coding, a receiving device may decode one or more code blocks of each codeword of a decoding level using code-protected partitioning information conveyed by the corresponding one or more code blocks of one or more codewords associated with the lower decoding levels. In some cases, decoding a level may be dependent on a successful decoding of a previous levels. For example, if a device (e.g., UE 115) fails to accurately decode one or more code blocks of a codeword associated with a first (e.g., lower) decoding level (i.e., fails a CRC), then the UE 115 may fail to decode one or more code blocks of a codeword associated with a second (e.g., higher) decoding level. Such decoding level dependency may lead to error propagation.

According to one or more aspects of the present disclosure, the UE 115 may receive a CBG from a base station 105. A CBG may include code blocks of one or more codewords associated with one or more decoding levels. More specifically, the CBG may include a set of codewords mapped to a first decoding level and another set of codewords mapped to a second decoding level. Upon receiving the CBG, the UE 115 may attempt a decoding procedure to decode the one or more codewords or corresponding code blocks included in the CBG. In some examples, the UE 115 may determine that the decoding procedure is unsuccessful. Accordingly, the UE 115 may transmit, to the base station 105, a feedback message indicating that the decoding procedure was unsuccessful and indicating a lowest decoding level for which the decoding procedure was unsuccessful.

In a first example, the UE 115 may successfully decode codewords (or corresponding code blocks) of a first decoding level and fails to decode codewords of a second decoding level. In a second example, the UE 115 fails to decode codewords (or corresponding code blocks) of a first decoding level and defers decoding of codewords (or corresponding code blocks) of a second decoding level. In both cases, the UE 115 may identify a lowest decoding level associated with the at least one failed code block. For example, in the first example, the lowest decoding level associated with at least one failed code block is the second coding level and in the second example, the lowest decoding level associated with at least one failed code block is the first decoding level. Upon identifying the lowest decoding level, the receiving device (UE 115) may transmit a NACK message and an indication of the lowest decoding level for which decoding has failed. For instance, in the first example, the UE 115 may transmit a NACK message and an indication of the second coding level. In the second example, the UE may transmit a NACK message and an indication of the first decoding level. In response, the base station 105 may determine a set of code blocks included in the failed CBG corresponding to the lowest failed decoding level/codewords for retransmission.

In some cases, the base station 105 may determine to retransmit a set of code blocks associated with the codewords (or decoding levels) for which the decoding was unsuccessful. Additionally or alternatively, the base station 105 may determine to transmit a set of new codewords (and related code blocks) associated with a decoding level for which the decoding procedure was successful or for which the decoding procedure was not attempted (or deferred). Implementing various aspects of this disclosure may allow for a hierarchical HARQ procedure where codewords (or their corresponding code blocks included in the addressed CBG) are gradually retransmitted upon an unsuccessful decoding procedure. Gradually retransmitting codewords (or corresponding code blocks sharing the same channel resources) may decrease the number of codewords/code blocks that are retransmitted during HARQ procedures. Additionally or alternatively, decreasing the number of retransmitted codewords may increase system efficiency and decrease communications overhead in wireless communications systems.

Figure 2:
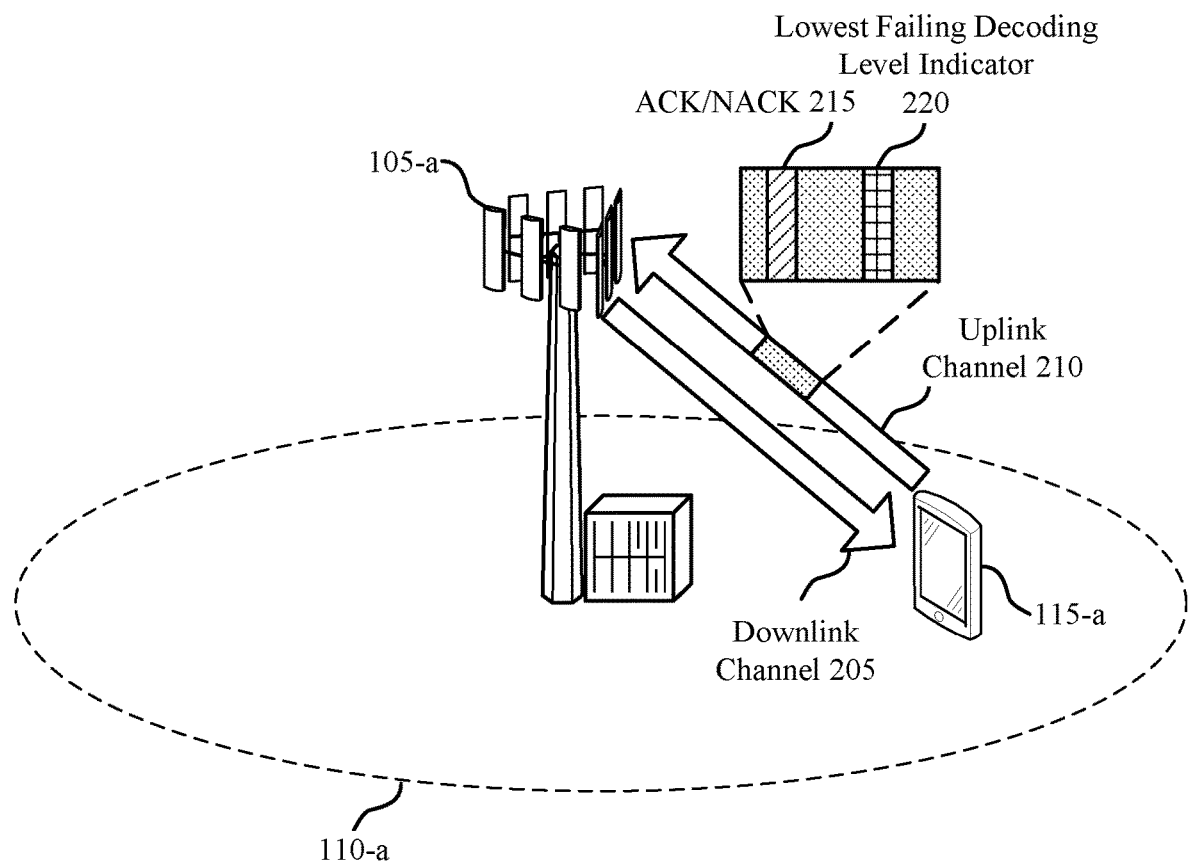
FIG. 2 illustrates an example of a wireless communications system that supports hierarchical HARQ across different decoding levels in accordance with aspects of the present disclosure.
Figure 2:

FIG. 2 illustrates an example of a wireless communications system 200 that supports hierarchical HARQ across different decoding levels in accordance with aspects of the present disclosure. In some examples, the wireless communications system 200 may implement aspects of a wireless communications system 100. The wireless communications system 200 may include a UE **115-*a* which may be an example of a UE 115 as described with reference to FIG. 1. The wireless communications system 200 may also include a base station 105-*a* which may be an example of a base station 105 as described with reference to FIG. 1. The base station 105-*a* may be associated with a cell which provides wireless communications service within a respective coverage area 110. The base station 105-*a* may transmit information to one or more UEs 115 on a downlink channel 205, and the UE 115-*a* may transmit messages to the base station 105-*a* on an uplink channel 210**.

The wireless communications system 200 may use a multi-level coding scheme with multi-level sequential demodulation and decoding to improve spectral efficiency. Multi-level coding with multi-level sequential demodulation and decoding on a receiver side may assume strong dependencies of demodulation/decoding of the higher decoding levels on the previous decoding level result (e.g., based on whether the previous coding level passed or failed). In some cases, the dependence of higher decoding (or partitioning) levels on the previous decoding/partitioning level may be high. As described herein, the multi-level coding scheme may use an Ungerboeck set partitioning to partition a modulation constellation into different constellation subsets. Partitioning at different levels may use different component codes/decoding levels having different code rates such that different partitioning levels may have different levels of code protection. In some examples, Ungerboeck set partitioning may gradually increase a minimum Euclidian distance between constellation points progressively with partitioning steps (and corresponding coding levels). For instance, the Ungerboeck set partitioning is intended to gradually increase a minimum Euclidian distance between constellation subsets from a low partitioning level to a high partitioning level. Accordingly, the minimum Euclidian distance, and a corresponding code rate, may increase from a lowest coding level to a highest coding level. A coding level may be decoded using a component code that corresponds to the code rate aligned with the minimum Euclidian distance for the coding level. In some cases, a coding level may be referred to as a decoding level at a UE 115.

As described herein, a UE 115 may not be able to successfully decode the higher decoding level(s) if the previous, lower decoding level fails. In particular, in cases of multi-level coding with Ungerboeck set partitioning, decoding of a decoding level may be dependent on a successful decoding of a previous level. For example, if a device fails to accurately decode one or more code blocks of a codeword associated with a first decoding level, then the device may fail to decode one or more corresponding code blocks of a codeword associated with a second decoding level. In some cases, failing to accurately decode one or more code blocks of a codeword may include the codeword or code blocks failing a CRC. In some cases, such a decoding level dependency may lead to error propagation of multilevel sequential decoding in receivers.

In some examples, for any type of multi-level sequential demodulation and decoding scheme (e.g., for coherent modulation or non-coherent modulation), because of the existing dependencies between different decoding levels, a hierarchical HARQ procedure may be utilized to increase efficiency of the wireless communications system 200. As described herein, a device (e.g., a base station 105) may refrain from performing retransmission for all the failing codewords related to different decoding levels at the same time once one or a few code blocks related to a decoding level fail. One or more aspects of the present disclosure provides for gradual retransmission of a lowest failing decoding level.

In some cases of multi-level coding, a CBG may include one or more code blocks of codewords associated with different decoding levels, such that one or more code blocks of codewords associated with different decoding levels span a same portion of transmitted REs. Because all decoding levels may be affected equally by channel conditions, including one or more code blocks of codewords of different decoding levels in a CBG may be beneficial. For example, common ACK signaling for all decoding levels may provide an increased efficiency over using multiple ACK messages for different decoding levels separately. Additionally or alternatively, localizing a CBG on a set of channel resources instead of spreading it out on a wide range or REs may decrease a failing rate and a retransmission rate associated with the CBG. Further, defining multiple decoding levels in a CBG may allow for small resource allocations, increasing efficiency in the wireless communications system 200. Accordingly, the base station 105-a may transmit a CBG including a set of code blocks of codewords associated with different decoding levels to the UE 115-a.

In response to receiving the CBG, the UE 115-a may attempt to decode code blocks associated with a first (e.g., a lowest) decoding level. If the UE 115-a successfully decodes all the code blocks included in the addressed CBG and associated with the codeword associated with the first decoding level, such that all the corresponding code blocks of the codeword pass a CRC, then the UE 115-a may attempt to decode the corresponding code blocks of codeword associated with a second (e.g., a higher) decoding level. If the UE 115-a successfully decodes all the code blocks of all codewords included with the CBG, the UE 115-a may transmit an ACK message 215 to the base station 105-a. If the UE 115-a fails to decode at least one code block corresponding to the addressed CBG, the UE 115-a may transmit a NACK message for the CBG to the base station 105-a and a lowest failing decoding level indicator 220 which may include an indication of the lowest decoding level that failed to decode. In response to receiving the NACK message 215, the base station 105-a may determine a set of code blocks to transmit.

In some cases, the base station 105-a may determine to retransmit one or more code blocks of the codeword that the UE 115-a failed to decode. In some examples, retransmitting one or more code blocks of the codeword may include transmitting a second redundancy version of one or more code blocks of the codeword. Additionally or alternatively, the base station 105-a may determine to transmit one or more code blocks of a new codeword (e.g., a codeword associated with data that was not conveyed previously) associated with a higher decoding level than the codeword that failed to decode. In some cases, the base station 105-a may send a new data indicator via control signaling to the UE 115-a indicating that new codewords are being transmitted in the corresponding CBG. In some cases, the base station 105-a may send the new data indicator in a downlink control information message. In some cases, the base station 105-a may transmit a retransmission indicator with the new data indicator informing the UE 115-a that one or more code blocks of the failing codeword are being retransmitted while other code blocks (e.g., corresponding to a different decoding level) convey a new data transmission. Thus, the base station 105-a may gradually retransmit one or more code blocks of codewords as part of a hierarchical HARQ procedure.

In some cases, performing a hierarchical HARQ procedure may be based on a capability of the UE 115-a. For example, performing a hierarchical HARQ procedure may be based on a capability of the UE 115-a to store frequency domain REs (or the corresponding post processing samples). Similarly, the UE 115-a may be capable to send an additional flag in control signaling (e.g., in a field of an uplink control information message) to the base station 105-a, indicating a lowest failing decoding level. For example, the UE 115-a may transmit, to the base station, a feedback message including an indicator that a decoding procedure was unsuccessful for a CBG and a second indicator of a lowest decoding level of one or more code blocks for which the decoding procedure was unsuccessful (e.g., the lowest failing decoding level indicator 220).

In some examples, the UE 115-a may transmit a capability indicator to the base station 105-a indicating a capability of the UE 115-a to perform a hierarchical HARQ procedure. For example, the UE 115-a may transmit, to the base station 105-a, an indication of a capability of the UE 115-a to support a maximum number of hierarchical HARQ buffers associated with a number of HARQ processes. In some cases, a processing capability may be defined indicating a maximum number of frequency domain samples buffers supported by the UE 115-a. If a frequency domain sample buffers limit of the UE 115-a is reached, the base station 105-a may begin retransmitting the redundancy version 0 of code blocks of codewords corresponding to all the decoding levels above the lowest failing decoding level indicated by a UE 115-*a*. The base station 105-*a* may transmit control signaling to the UE 115-*a* indicating that the UE 115-*a* should handle the retransmitted codewords for decoding levels above the lowest one that failed as if they were a new set of codewords (e.g., such that the control signaling includes a new data indicator and an indication to discard the codewords corresponding to these decoding levels associated with a HARQ ID history or HARQ buffers). In some cases, the indications may be sent in a downlink control information message. In some cases, if UE does not have enough processing resources to immediately address all the active hierarchical HARQ IDs and attempt decoding of all the higher decoding levels based on the stored post processing samples and reliable partitioning information from the lower decoding levels available after its successful decoding (e.g., after one or more retransmissions for a lower decoding level), the UE 115-*a* may report a NACK for a CBG that the UE 115-*a* did not finish processing and may transmit an indication that the UE 115-*a* successfully decoded codewords of the first decoding level. The UE 115-*a* may preserve all data stored as part of the hierarchical HARQ procedure and proceed to decode the unprocessed codewords immediately once processing resources are available. The UE 115-*a* may transmit an ACK message 215 if all decoding levels are successfully decoded.

As described herein, the UE 115-*a* may signal that the UE 115-*a* supports a hierarchical HARQ procedure via corresponding capability information. Having a capability to support the hierarchical HARQ procedure may impact an ability of the UE 115-*a* to store frequency domain post processing samples. Additionally, ACK/NACK transmission-related logic including new flag(s) coupled to each NACK in uplink control information may be defined for the UE 115-*a* (e.g., if the UE 115-*a* supports the hierarchical HARQ procedure). In some cases, the UE 115-*a* may be configured with an ability to address additional downlink control information flags for new data indication for different decoding levels. In some examples, the corresponding capability to support some number of hierarchical HARQ processes may impact an ability for the UE 115-*a* to perform extra processing once hierarchical HARQ processes are collapsed. In some examples, a maximum number of hierarchical HARQ processes may be limited according to the corresponding capability in order to keep a predictable maximum buffering (e.g., a frequency domain samples/REs buffer) requirement and a peak processing envelope at the UE 115-*a*.

In some examples, once a hierarchical HARQ limit is reached (e.g., if a maximum number of hierarchical HARQ processes have been used), the base station 105-*a* may switch to a different type of HARQ procedure for all decoding levels. For example, for the codewords from a specific CBG and corresponding to decoding levels above the lowest failing decoding level, the base station 105-*a* may initiate re-sending a redundancy version 0 (RV0) on every following subframe coupled to a corresponding lower level transmission for that CBG (e.g., such that no new second decoding level codewords may be coupled to retransmissions of the first decoding level codewords). Additionally or alternatively, for every re-scheduling of a redundancy version 0, the base station 105-*a* may set two flags in the scheduling downlink control information. For example, the base station 105-*a* may use a new data indicator flag for the second decoding level to signal that codewords (or corresponding code blocks) included in the addressed CBG and related to the second decoding level (including repetition of the previously sent redundancy version 0) is to be addressed as new data. Additionally or alternatively, the base station 105-*a* may set a CBG flushing out information flag for the second coding level of the CBG, which indicates that the previous hierarchical HARQ process buffer for the second decoding level of this CBG should be discarded by the UE 115-*a*.

In some examples, when an instant peak load related to hierarchical HARQ processing is reached, some processing threshold may be crossed at the UE 115-*a* such that UE 115-*a* is not able to carry out the functions associated higher level decoding. In such a case, the UE 115-*a* may continue to report NACK for CBGs that did not get priority to finish all related processing (for all decoding levels codewords or code blocks). Additionally, the UE 115-*a* may set the bit "lowest_code_level_NACK" to 0 to indicate that all the code blocks of the codewords of the first decoding level are decoded and no retransmissions are required. In some examples, the UE 115-*a* may preserve all the hierarchical HARQ related buffers for these CBGs. In some examples, the UE 115-*a* may perform processing at a nearest occasion and may report ACK on a following reporting opportunity in case the decoding on all levels was successful for the addressed CBG.

Implementing various aspects of the present disclosure may thus include features for improvements to spectral efficiency, higher data rates and, in some examples, with some modifications to HARQ procedures may promote reduced latency operations upon retransmissions, among other benefits.

Figure 3:
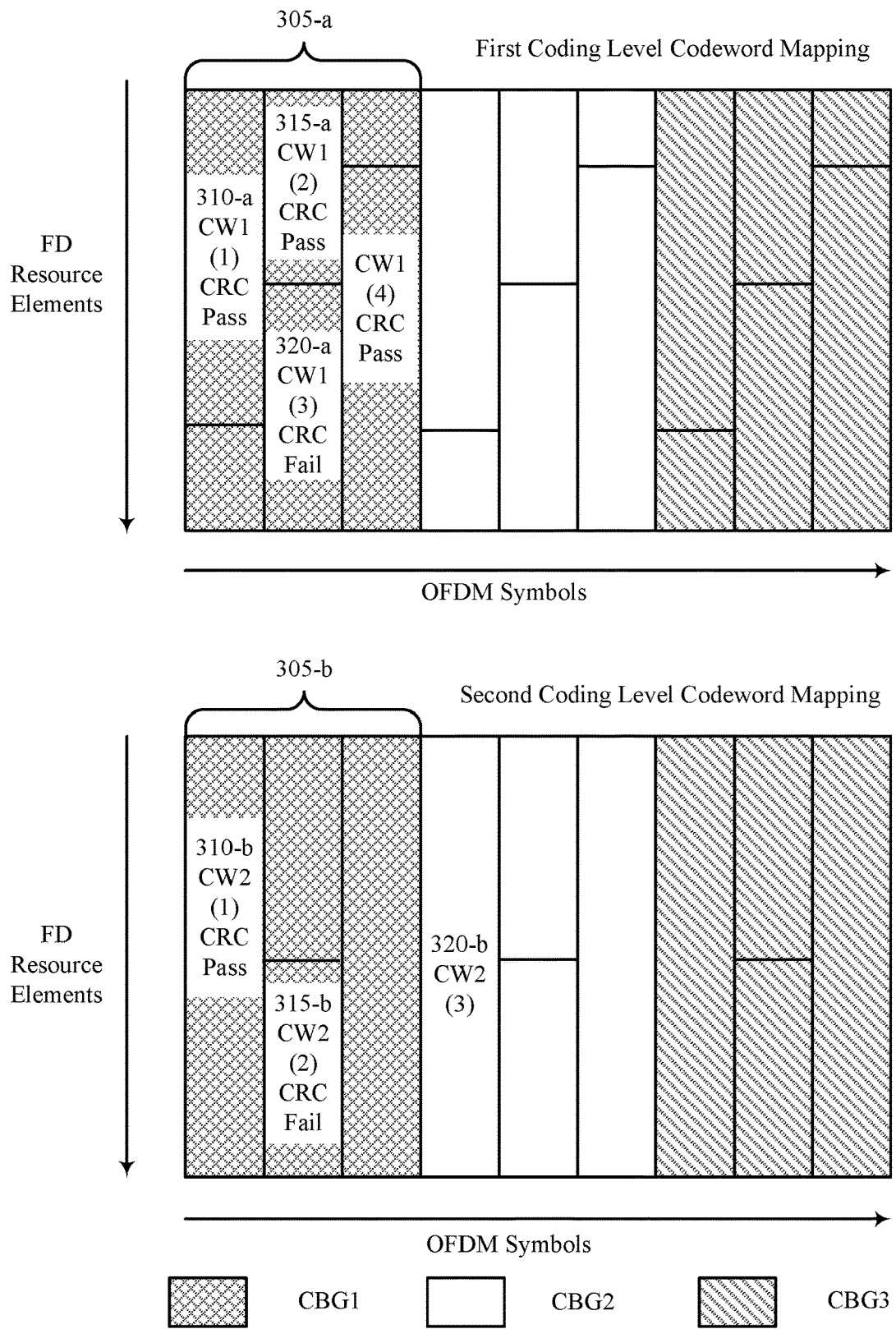
FIG. 3 illustrates an example of a coding scheme that supports hierarchical HARQ across different decoding levels in accordance with aspects of the present disclosure.

FIG. 3 illustrates an example of a multi-level coding scheme 300 with code blocks grouping across different decoding levels (CBG includes CBs associated with different decoding levels) that supports hierarchical HARQ across different decoding levels in accordance with aspects of the present disclosure. In some examples, the multi-level coding scheme 300 may implement aspects of a wireless communications system 100 or 200. For example, the multi-level coding scheme 300 may be implemented by a UE 115, a base station 105, or any combination thereof. In some cases the multi-level coding scheme 300 may use two decoding levels.

As described herein, a CBG may include code blocks of codewords associated with two or more decoding levels. In some examples, a CBG may include a portion 305-*a* associated with a first decoding level and a portion 305-*b* associated with a second decoding level. Accordingly, code blocks associated with the first decoding level and code blocks associated with the second decoding level may span a same number of REs. A number of code blocks equal to a number of code blocks associated with the first decoding level plus a number of code blocks associated with the second decoding level may be coupled together for HARQ procedures. In some cases, code blocks/codewords associated with the first decoding level may be shorter in length than code blocks/codewords associated with the second decoding level. In some examples, the difference in code block length may reduce latency when a UE performs multi-level sequential demodulation and decoding.

In some cases, a code block 310-*a* may be a first code block of a first codeword associated with the first decoding level and a code block 310-*b* may be a first code block of a second codeword associated with the second decoding level. In one example, a receiving device may fail to decode code block 320-*a* during a slot N. If code block 320-*a* fails to decode, then code block 315-*b* may fail to decode or may not be attempted for decoding. Accordingly, the receiving device may report a NACK for the CBG that includes portion 305-a and portion 305-b and an indication of the lowest failing decoding level. In some examples, the indication of the lowest failing decoding level may be set to 1 if at least one code blocks associated with the first decoding level failed to decode and set to 0 otherwise. In some cases the indication of the lowest failing decoding level may be a "lowest_code_level_NACK" parameter (e.g., indicator or bit) sent with the NACK message. In response to receiving a NACK, a transmitting device may retransmit code blocks of 305-a during a slot N+K. During the slot N+K, the transmitting device may use new data for transmitting code blocks of 305-b associated with the second decoding level.

In some cases, the receiving device may decode all the code blocks of the first decoding level that are included in CBG1 305-a successfully during slot N+K. If all code blocks of 305-a are decoded successfully, the receiving device may decode one or more corresponding code blocks of CBG1 305-b that are associated with the new data/codeword of the second decoding level transmitted on slot N+K. Additionally or alternatively, the receiving device may re-attempt decoding of the code block 315-b from slot N using known partitioning information associated with the first decoding level that is decoded successfully after the transmission on slot N+K (e.g., because both retransmissions (RV0 and RV1) for this decoding level can be regenerated on the receiver side after successful decoding). In some cases, the receiving device may store a portion of samples associated with one or more code blocks of 305-b from slot N to allow for subsequent decoding. If the receiving device successfully decodes all the code blocks of 305-b, the receiving device may transmit an ACK message for the portion 305-b of the CBG1 to the transmitting device. Performing a hierarchical HARQ procedure may reduce the number of code blocks that are retransmitted by a transmitting device. Various aspects of hierarchical HARQ procedures are further described with reference to FIGS. 4-6.

Figure 4:
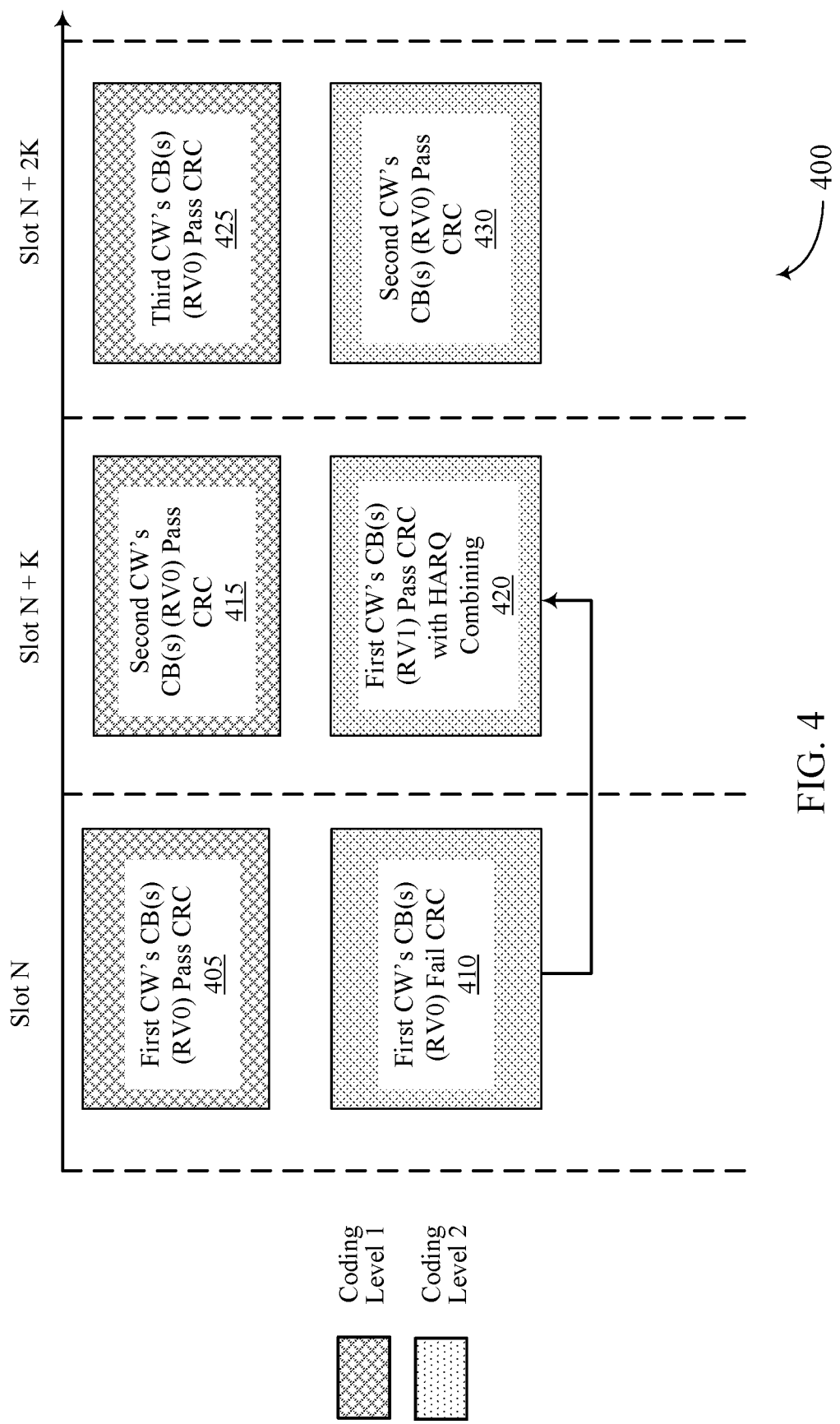
FIG. 4 illustrates an example of a processing timeline that supports hierarchical HARQ across different decoding levels in accordance with aspects of the present disclosure.

FIG. 4 illustrates an example of a processing timeline 400 that supports hierarchical HARQ across different decoding levels, in accordance with one or more aspects of the present disclosure. In some examples, the processing timeline 400 may implement aspects of a wireless communications system 100 or 200. For example, the processing timeline 400 may be implemented by a UE 115 (or receiving device), a base station 105 (or transmitting device), or any combination thereof.

During a slot N, a transmitting device may transmit a first codeword's set of code blocks 405 associated with a first decoding level and a first codeword's set of code blocks 410 associated with a second decoding level. In some cases, transmitting the first codeword may include transmitting a first set of code blocks associated with the first codeword for each decoding level. A receiving device may decode the set of code blocks 405 successfully (e.g., such that the set of code blocks 405 corresponding to the first decoding level codeword that are included in the addressed CBG pass a CRC). The receiving device may determine that a decoding procedure for the first set of code blocks 410 associated with the second decoding level codeword and that are also included in the addressed CBG is unsuccessful. If the receiving device fails to decode the set of code blocks 410, the receiving device may transmit a NACK message and an indication that the second decoding level is the lowest failing level. For instance, the receiving device may transmit a feedback message including a first indicator (e.g., NACK message) that the decoding procedure was unsuccessful for the CBG and a second indicator of a lowest decoding level of one or more code blocks for which the decoding procedure was unsuccessful, the lowest decoding level being one of a set of decoding levels supported by the receiving device.

In some cases, the receiving device may set one or more bits associated with the second indicator of the decoding level, such that a value of the one or more bits identifies the lowest decoding level associated with the code blocks for which the decoding procedure was unsuccessful. In some examples, the one or more bits may include one bit that is set to indicate the lowest decoding level of the set of decoding levels supported by the receiving device, where the set of decoding levels includes two decoding levels. Alternatively, the one or more bits may include two or more bits that are set to indicate the lowest decoding level of the set of decoding levels supported by the receiving device, where the set of decoding levels includes three or more decoding levels. For example, the receiving device may include an extra bit with the NACK reported for the CBG (e.g., the CBG associated with the set of code blocks 405 associated with the first decoding level and the first set of code blocks 410 associated with the second decoding level). The extra bit may be set to 1 if there are any failing code blocks from the first decoding level and 0 otherwise. In the example of FIG. 4, the receiving device may transmit a NACK for the CBG (e.g., the CBG associated with the set of code blocks 405 and the set of code blocks 410 and may set the bit "lowest_code_level_NACK" to 0. In some instances, the receiving device may store a log likelihood ratio associated with the code blocks of the lowest decoding level (second decoding level) and a HARQ process identifier and an indication associated with the coding level for which the decoding procedure was unsuccessful.

Accordingly, during slot N+K, the transmitting device may transmit a set of code blocks 415 of a second codeword associated with the first decoding level and an indication that the transmission includes new data. The transmitting device may transmit a control message (e.g., downlink control information) responsive to the feedback message including the second indicator indicating that the decoding procedure associated with the first set of code blocks 410 associated with the second decoding level is unsuccessful. In some examples, once hierarchical HARQ procedure is employed, the control message may include a retransmission indicator and a new data indicator. The new data indicator may be associated with all the decoding levels excluding the lowest one level that failed decoding during the previous transmission (this specific decoding level will get retransmission indication).

During slot N+K, the transmitting device may retransmit the first set of code blocks 410 associated with the second decoding level. In some cases, retransmitting the first set of code blocks 410 may include transmitting a first redundancy version (RV1) 420. The receiving device may successfully decode the set of code blocks 415 (code blocks associated with a new codeword for the first decoding level) and will be able to determine the required reliable partitioning information for demodulation of the second decoding level and thus may reattempt to decode the set of code blocks 410 using HARQ combining with the first redundancy version (RV1) 420. In some cases, the receiving device may decode the set of code blocks 410 for the second decoding level using stored log likelihood ratios. If the receiving device successfully decodes the set of code blocks 410, the receiving device may transmit an ACK message for the transmissions received during slot N and slot N+K. Additionally, the receiving device may release a log likelihood buffer upon successful decoding of the set of code blocks 410.

In response to receiving an ACK message and during slot N+2K, the transmitting device may transmit a set of code blocks 425 associated with a new codeword of the first decoding level and a new set of code blocks 430 associated with a new codeword of the second decoding level. If the receiving device successfully decodes the sets of code blocks 425, and 430, the receiving device may transmit an ACK message for the transmission received during slot N+2K.

Figure 5:
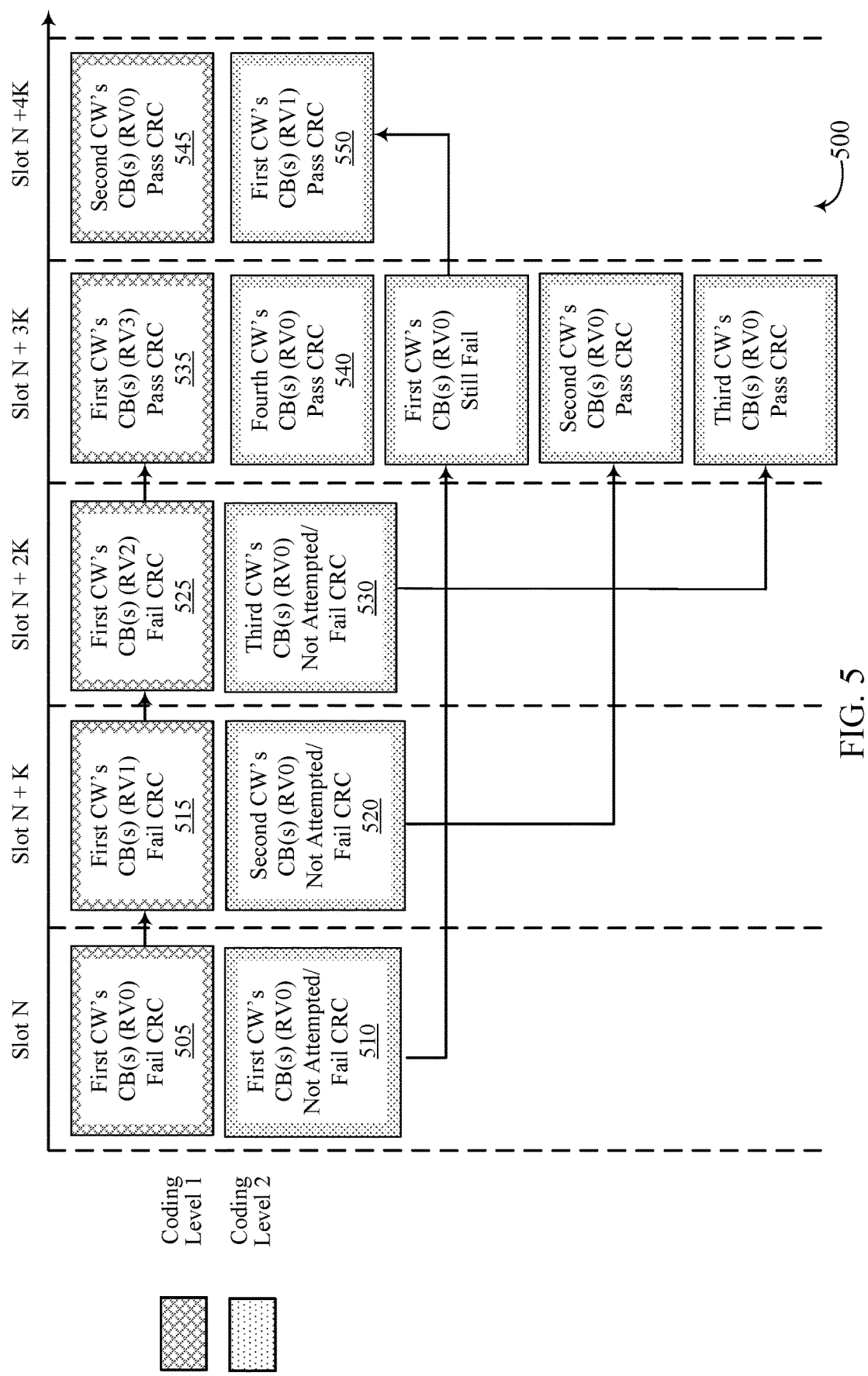
FIG. 5 illustrates an example of a processing timeline that supports hierarchical HARQ across different decoding levels in accordance with aspects of the present disclosure.

FIG. 5 illustrates an example of a processing timeline 500 that supports hierarchical acknowledgement across different decoding levels, in accordance with one or more aspects of the present disclosure. In some examples, the processing timeline 500 may implement aspects of a wireless communications system 100 or 200. For example, the processing timeline 500 may be implemented by a UE 115, a base station 105, or any combination thereof.

During a slot N, a transmitting device may transmit a set of code blocks 505 of a first codeword associated with a first decoding level and a set of code blocks 510 of a first codeword associated with a second decoding level. In some cases, transmitting the set of code blocks 505 and the set of code blocks 510 may include transmitting a first set of code blocks associated with the first set of codewords for each decoding level correspondingly while this set of code blocks is associated with an addressed CBG. A receiving device may attempt to decode the set of code blocks 505 and the set of code blocks 510. If the receiving device fails to successfully decode the first set of code blocks 505, the receiving device may not attempt to decode the set of code blocks 510. For example, the receiving device may determine that a decoding procedure for the first set of code blocks 505 associated with the first decoding level is unsuccessful, and the receiving device may transmit a NACK message and an indication that the first decoding level is the lowest failing decoding level. For instance, the receiving device may transmit a feedback message including a first indicator (e.g., NACK message) that the decoding procedure was unsuccessful for the addressed CBG and a second indicator of a lowest decoding level of one or more code blocks for which the decoding procedure was unsuccessful, the lowest decoding level being one of a set of decoding levels supported by the receiving device. Accordingly, in the example of FIG. 5, the receiving device may transmit a NACK message for the slot N and set the bit "lowest_code_level_NACK" to 1 indicating that the lowest decoding level to fail is the first decoding level.

Accordingly, during a slot N+K, a transmitting device may transmit a first redundancy version (RV1) 515 associated with the set of code blocks 505 included in the addressed CBG, and a new set of code blocks 520 associated with a new codeword of the second decoding level and also included in the addressed CBG on slot N+K, and a new data indicator for the second decoding level informing the receiving device that new data is being transmitted on this CBG for the second decoding level and a retransmission indication for the first decoding level (e.g., the lowest failing decoding level). In some examples, the transmitting device may include with the new data indication, an indication (e.g., a bit map) of coding levels to which the new data indicator applies. During slot N, as a result of decoding failure for the first decoding level, the receiving device may store a set of post processing samples corresponding to REs spanned by the set of code blocks 510. In response to retransmission of the first decoding level set of code blocks 515, the receiver may reattempt to decode the set of code blocks 505 using HARQ combining with the first redundancy version (RV1) 515 for this set of code blocks. If the receiving device still fails to decode the set of code blocks 505, the receiving device may not attempt to decode the set of code blocks 520 associated with the second decoding level on the slot N+K. Additionally or alternatively, the receiving device may store post-processing samples for the slot N+K. Accordingly, the receiving device may transmit a NACK message for the addressed CBG for the slot N+K and an indication that the lowest decoding level to fail for this CBG is the first decoding level.

During a slot N+2K, a transmitting device may transmit a second redundancy version (RV2) 525 associated with the set of code blocks 505 included in the addressed CBG, and a new set of code blocks 530 included in the addressed CBG as well and associated with a new codeword of the second decoding level, and a new data indicator for the second decoding level informing the receiving device that new data is being transmitted on this CBG for the second decoding level and an retransmission indication for the first decoding level (e.g., the lowest failing decoding level). In response, the receiving device may store post-processing samples associated with the set of code blocks 520 and reattempt to decode the set of code blocks 505 using HARQ combining with the first redundancy version (RV1) 515 and the second redundancy version (RV2) 525. If the receiving device fails to decode the set of code blocks 505, the receiving device may not attempt to decode the set of code blocks 530 associated with the second decoding level. Accordingly, the receiving device may transmit a NACK message for the slot N and an indication that the lowest decoding level to fail is the first decoding level.

During a slot N+3K, the transmitting device may transmit a third redundancy version (RV3) 535 associated with the set of code blocks 505, the new set of code blocks 540 associated with the second decoding level, and a new data indicator informing the receiving device that new data is being transmitted. The receiving device may store the new set of code blocks 530 and may reattempt to decode the first set of code blocks 505 using HARQ combining with the first redundancy version (RV1) 515, the second redundancy version (RV2)525, and the third redundancy version (RV3) 535. If the receiving device successfully decodes the first set of code blocks 505, the receiving device may attempt to decode the new set of code blocks 540. In the example of the FIG. 5, the receiving device is assumed to successfully decode the set of code blocks 540. In addition given the successful decoding of the first set of code blocks 505 of the first decoding level after retransmissions in 515, 525, and 535, the receiver may regenerate all redundancy versions of the set of code blocks 505 (including those corresponding to the retransmissions in 515, 525, and 535) and may be able to determine code-protected partitioning information for the second decoding level demodulation and decoding on the slot N, the slot N+K, the slot N+2K and the slot N+3K. Then the receiving device may attempt to decode the set of code blocks 510, the set of code blocks 520, and the set of code blocks 530 based on the stored post processing samples corresponding to resources spanned by the code blocks from the slot N, the slot N+K, and the slot N+2K. In one example, the receiving device may successfully decode the set of code blocks 520 and the set of code blocks 530 but may fail to decode the set of code blocks 510. Accordingly, the receiving device may transmit (or reconfirm) a NACK message for the slot N and an indication that the lowest failing decoding level is the now the second decoding level. In the example of FIG. 5, the receiving device will send ACK message for the addressed CBG for the slot N+K, the slot N+2K and the slot N+3K.

During a slot N+4K, the transmitting device may transmit a new set of code blocks 545 associated with a new codeword of the first decoding level and also associated with the addressed CBG and may transmit a first redundancy version (RV1) 550 associated with the set of code blocks 510 of the second decoding level (also a part of the addressed CBG). The receiving device may attempt to decode the set of code blocks 545. If the receiving device successfully decodes the set of code blocks 545, the receiving device may reattempt to decode the set of code blocks 510 using HARQ combining with the first redundancy version (RV1) 550. If the receiving device successfully decodes the set of code blocks 510, the receiving device may send an ACK message for the slot N and the slot N+4K.

In some cases, the receiving device may attempt to decode a set of code blocks/codewords associated with a second decoding level even if a set of code blocks/codewords associated with a first decoding level fails to decode. In such cases, if this decoding attempt will fail the receiving device may perform a hierarchical HARQ procedure as described herein.

Figure 6:
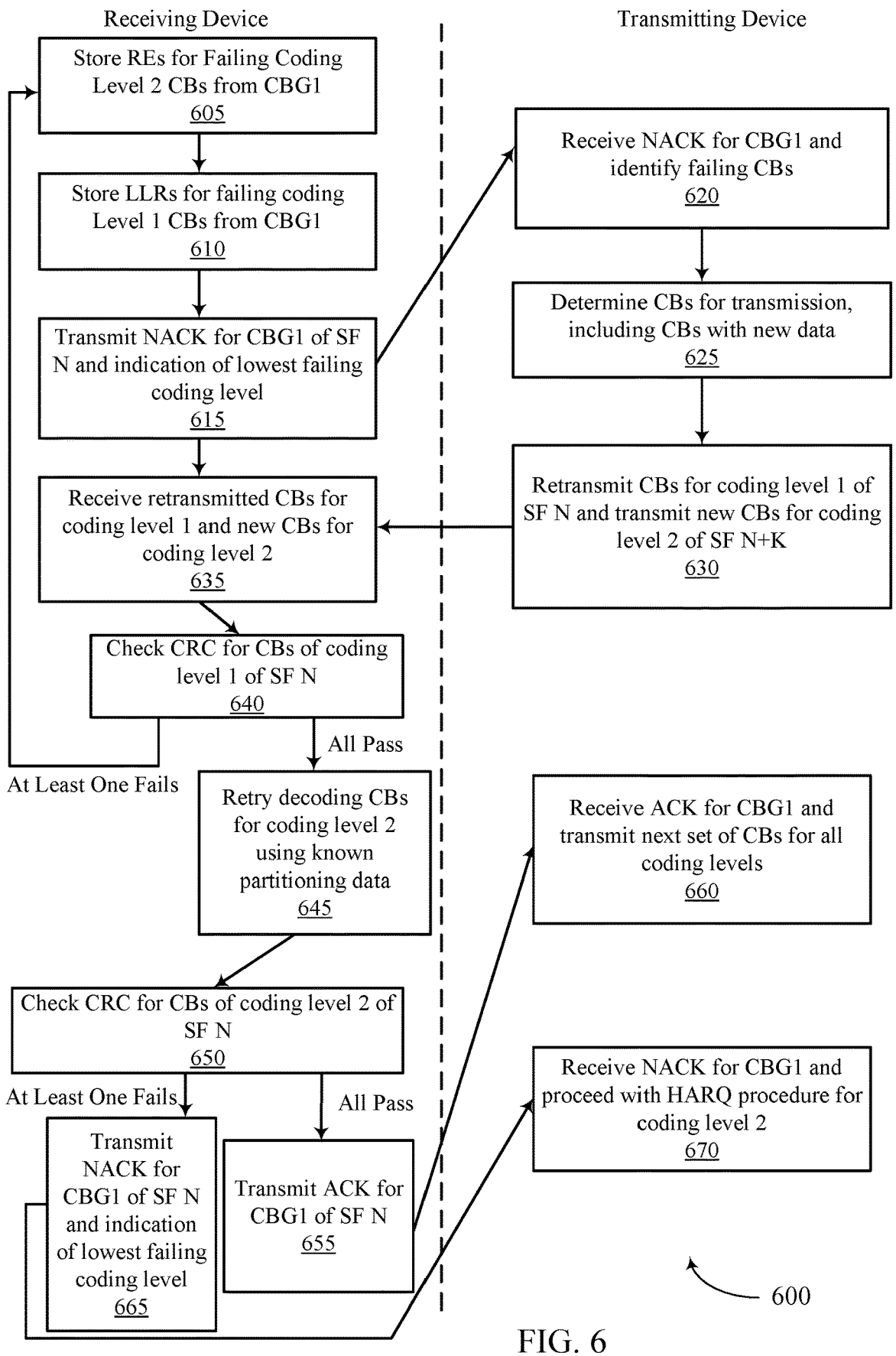
FIG. 6 illustrates an example of a process flow that supports hierarchical HARQ across different decoding levels in accordance with aspects of the present disclosure.

FIG. 6 illustrates an example of a process flow 600 that supports hierarchical HARQ across different decoding levels, in accordance with one or more aspects of the present disclosure. In some examples, the process flow 600 may implement aspects of a wireless communications system 100 or 200. For example, the process flow 600 may be implemented by a UE 115, a base station 105, or any combination thereof. In some cases, a receiving device and a transmitting device may perform the process flow 600 if codewords/code blocks included in a CBG1 and associated with a first (or some relatively lower) decoding level fail to decode successfully.

The receiving device (e.g., a UE) may determine that a decoding procedure associated with a first decoding level codeword or corresponding to it code blocks included in the addressed CBG1 is unsuccessful. At 605, the receiving device may store REs (e.g., post processing samples) associated with the failing code blocks of the second decoding level (or spanned by code blocks of the CBG1). In one example, the storing one or more post processing samples associated with a second decoding level code blocks based on determining that the decoding procedure associated with the corresponding first decoding level code blocks is unsuccessful. As described herein, the first decoding level codeword (or the corresponding set of code blocks) may be associated with the lowest decoding level of a set of decoding levels and the second decoding level codeword (or the corresponding set of code blocks) may be associated with a second decoding level of the set of decoding levels. Upon determining that a decoding procedure for the first decoding level is unsuccessful, the receiving device may store frequency domain samples on REs overlapping with the mapping region of code blocks associated with the second decoding level or of the CBG1.

At 610, the receiving device may store a log likelihood ratio (or combined log likelihood ratios) associated with the failing CBG1 code blocks of the first decoding level. For example, the receiving device may store a log likelihood ratios associated with the first decoding level CBG1 code blocks based on determining that the decoding procedure associated with this set of code blocks is unsuccessful.

At 615, the receiving device may transmit a NACK message for the CBG1 and an indication of the lowest failing decoding level (e.g., the first decoding level). In one example, the indication of the lowest failing decoding level may indicate lowest_code_level_NACK=1 (indicating the first decoding level).

At 620, the transmitting device may receive the NACK message and may identify the failing codewords (or corresponding code blocks). That is, the transmitting device may receive a NACK message for a CBG for which a decoding procedure was unsuccessful at the receiving device (e.g., the CBG 1). Upon receiving the NACK message, the transmitting device may identify that the receiving device was unable to decode one or more code blocks from the addressed CBG associated with the first decoding level.

At 625, the transmitting device may determine which code blocks to transmit with new data (e.g., code blocks associated with the corresponding decoding levels of a new codeword). In some cases, determining which new codewords to transmit may be based on the lowest failing decoding level indicated by the receiving device. In this example, the transmitting device may determine that retransmission of the second decoding level codewords (or corresponding code blocks) will be on hold until the corresponding code blocks of the previous decoding level (e.g., the first decoding level) pass a CRC.

At 630, the transmitting device may retransmit CBG1 code blocks for the first decoding level and may transmit a new set of CBG1 code blocks for the following decoding level (e.g., the second decoding level). In some cases, retransmitting the code blocks for the first decoding level may include transmitting another redundancy version of the code blocks. As described herein, the transmitting device may send a retransmission for the code blocks of the first decoding level from a first subframe and code blocks of a higher coding level defined using a new data bits portion. In some cases, the transmitting device may transmit a control message responsive to the feedback message indicating that the decoding procedure associated with the first codeword is unsuccessful. The control message may include a retransmission indicator and a new data indicator for the corresponding decoding level. As described herein, the retransmission flag signaled in the control message to indicate a HARQ process identifier and a redundancy version identifier, and the new data indicator may indicate that the transmitting device is transmitting new data for the second decoding level.

At 635, the receiving device may receive the retransmitted code blocks of the CBG1 of the first decoding level and the new code blocks of the CBG1 of the second decoding level. In one example, the receiving device may utilize the control message to determine that the transmitting device has transmitted a retransmission of code blocks of the first decoding level and new code blocks/codeword for the second decoding level.

At 640, the receiving device may reattempt decoding the code blocks of the first decoding level. In some cases, reattempting to decode the code blocks may include checking whether the code blocks pass a CRC. The receiving device may use HARQ combining with stored log likelihood ratios to decode the code blocks of the first decoding level. If the receiving device fails to decode at least one CBG1 code blocks associated with the first decoding level, the receiving device will proceed with step 605 as described herein.

At 645, if the receiving device successfully decodes all CBG1 code blocks of the first decoding level, the receiving device may regenerate all the transmitted redundancy versions of the first decoding level code blocks from CBG1 to obtain code-protected partitioning information for demodulating the second decoding level and may reattempt decoding CBG1 code blocks/codewords of the second decoding level based on the stored post processing samples from the previous slots and using known partitioning information. For example, the receiving device may decode code blocks of the second decoding level from a first transmission time interval based on corresponding post processing samples. After successfully decoding the CBG1 code blocks of the second decoding level from the first transmission time interval, the receiving device may decode, in a second transmission time interval, additional code blocks of the second decoding level (e.g., associated with additional codewords). The first transmission time interval may include a first subframe or a first slot, and the second transmission time interval may include a second subframe or a second slot.

At 655, if the receiving device successfully decodes all CBG1 code blocks of the second decoding level from slot N, the receiving device may transmit an ACK message for the CBG1 for slot N. At 660, the transmitting device may receive the ACK message for the CBG1 and may transmit the next set of codewords for both the first and the second decoding levels.

At 665, if the receiving device fails to decode at least one of the CBG1 code blocks of the second decoding level, the receiving device may transmit a NACK message for the CBG1 for slot N and an indication that the lowest failing decoding level is the second decoding level. At 670, the transmitting device may receive the NACK for the CBG1 and proceed with the HARQ procedure for the second decoding level of the CBG1. Implementing various aspects of the present disclosure may thus include features for improvements to spectral efficiency, higher data rates and, in some examples, may promote a reduced volume of retransmissions, among other benefits.

Figure 7:
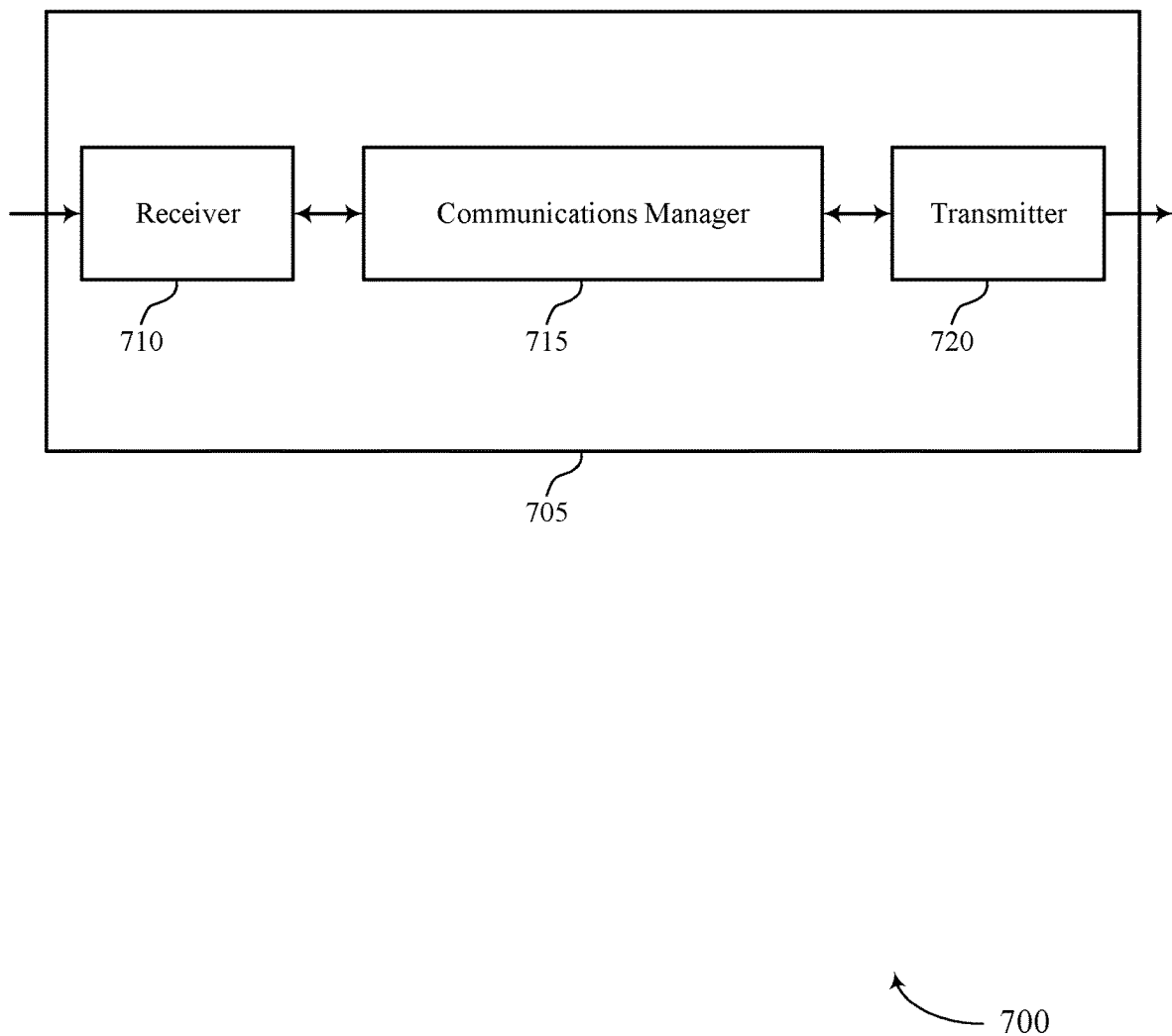
FIGS. 7 and 8 show block diagrams of devices that support hierarchical HARQ across different decoding levels in accordance with aspects of the present disclosure.

FIG. 7 shows a block diagram 700 of a device 705 that supports hierarchical HARQ across different decoding levels in accordance with aspects of the present disclosure. The device 705 may be an example of aspects of a UE 115 as described herein. The device 705 may include a receiver 710, a communications manager 715, and a transmitter 720. The device 705 may also include one or more processors, memory coupled with the one or more processors, and instructions stored in the memory that are executable by the one or more processors to enable the one or more processors to perform the hierarchical HARQ across different decoding levels features discussed herein. Each of these components may be in communication with one another (e.g., via one or more buses).

The receiver 710 may receive information such as packets, user data, or control information associated with various information channels (e.g., control channels, data channels, and information related to hierarchical hybrid automatic repeat request across different decoding levels, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station in a first transmission time interval, a code block group including a set of code blocks associated with a set of codewords, each codeword of the set of codewords associated with one of a set of decoding levels of a decoding procedure for the code block group, receive, from the base station in a second transmission time interval and based on the transmitted feedback message, a retransmission of code blocks included in the failed code block group and corresponding to a code word of the lowest failing decoding level, determine that the decoding procedure associated with one or more code blocks of the set of code blocks included in the code block group and associated with codewords of the set of codewords is unsuccessful, and transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
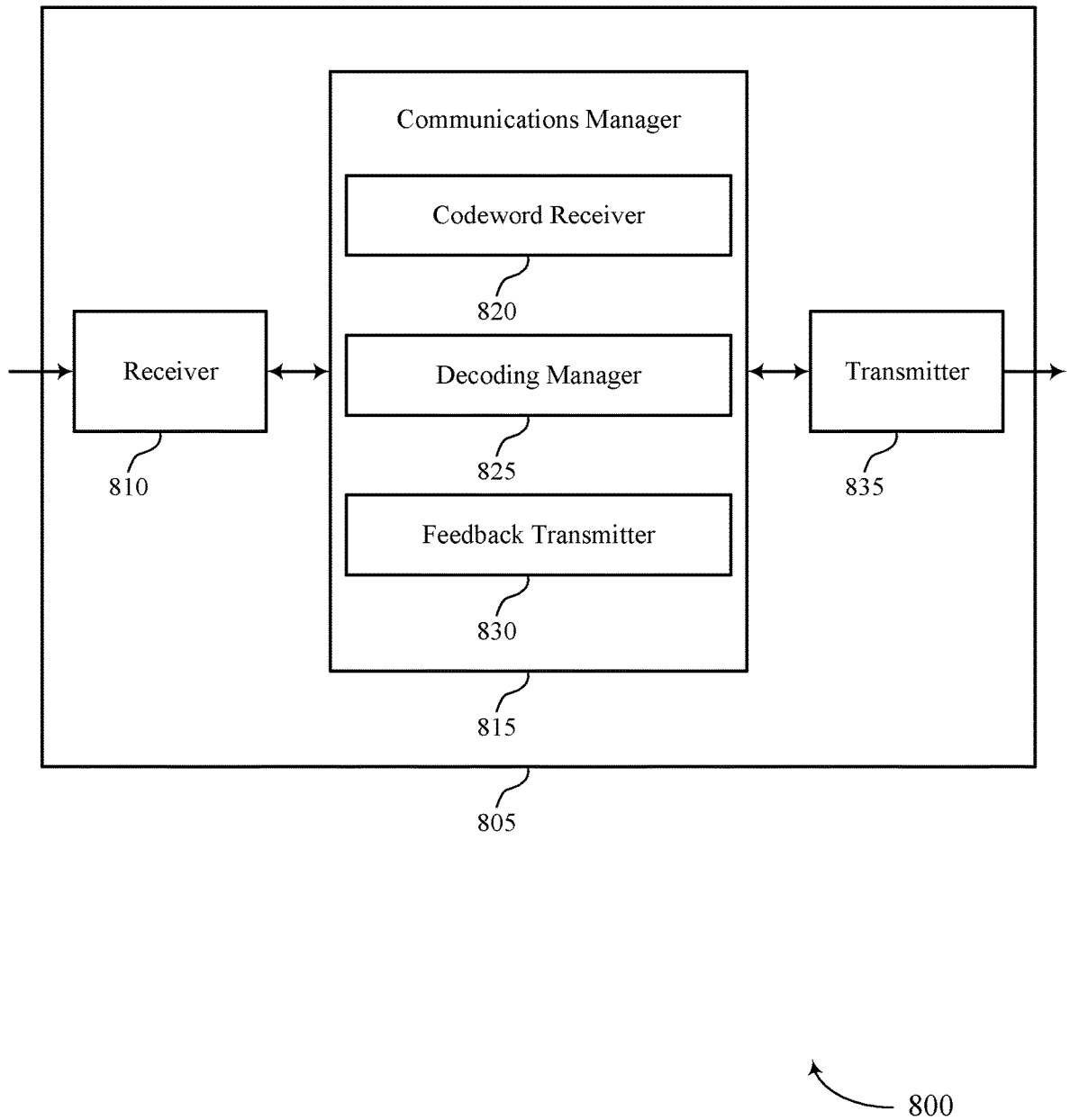

FIG. 8 shows a block diagram 800 of a device 805 that supports hierarchical hybrid automatic repeat request across different decoding levels in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to hierarchical hybrid automatic repeat request across different decoding levels, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a codeword receiver 820, a decoding manager 825, and a feedback transmitter 830. The communications manager 815 may be an example of aspects of the communications manager 1010 described herein.

The codeword receiver 820 may receive, from a base station in a first transmission time interval, a code block group including a set of code blocks associated with a set of codewords, each codeword of the set of codewords associated with one of a set of decoding levels of a decoding procedure for the code block group and receive, from the base station in a second transmission time interval and based on the transmitted feedback message, a retransmission of code blocks included in the failed code block group and corresponding to a code word of the lowest failing decoding level.

The decoding manager 825 may determine that the decoding procedure associated with one or more code blocks of the set of code blocks included in the code block group and associated with codewords of the set of codewords is unsuccessful.

The feedback transmitter 830 may transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

In some cases, the codeword receiver 820, the decoding manager 825, and the feedback transmitter 830 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the codeword receiver 820, the decoding manager 825, and the feedback transmitter 830 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

In some cases, using a hierarchical HARQ procedure may increase the efficiency of device 705. For example, a device 705 that supports the hierarchical HARQ procedure may reduce a volume of retransmitted code blocks. Accordingly, a device 705 that supports the hierarchical HARQ procedure may utilize the techniques described herein to experience power saving, such as reduced power consumption and extended battery life while ensuring reliable and efficient communications, among other benefits.

Figure 9:
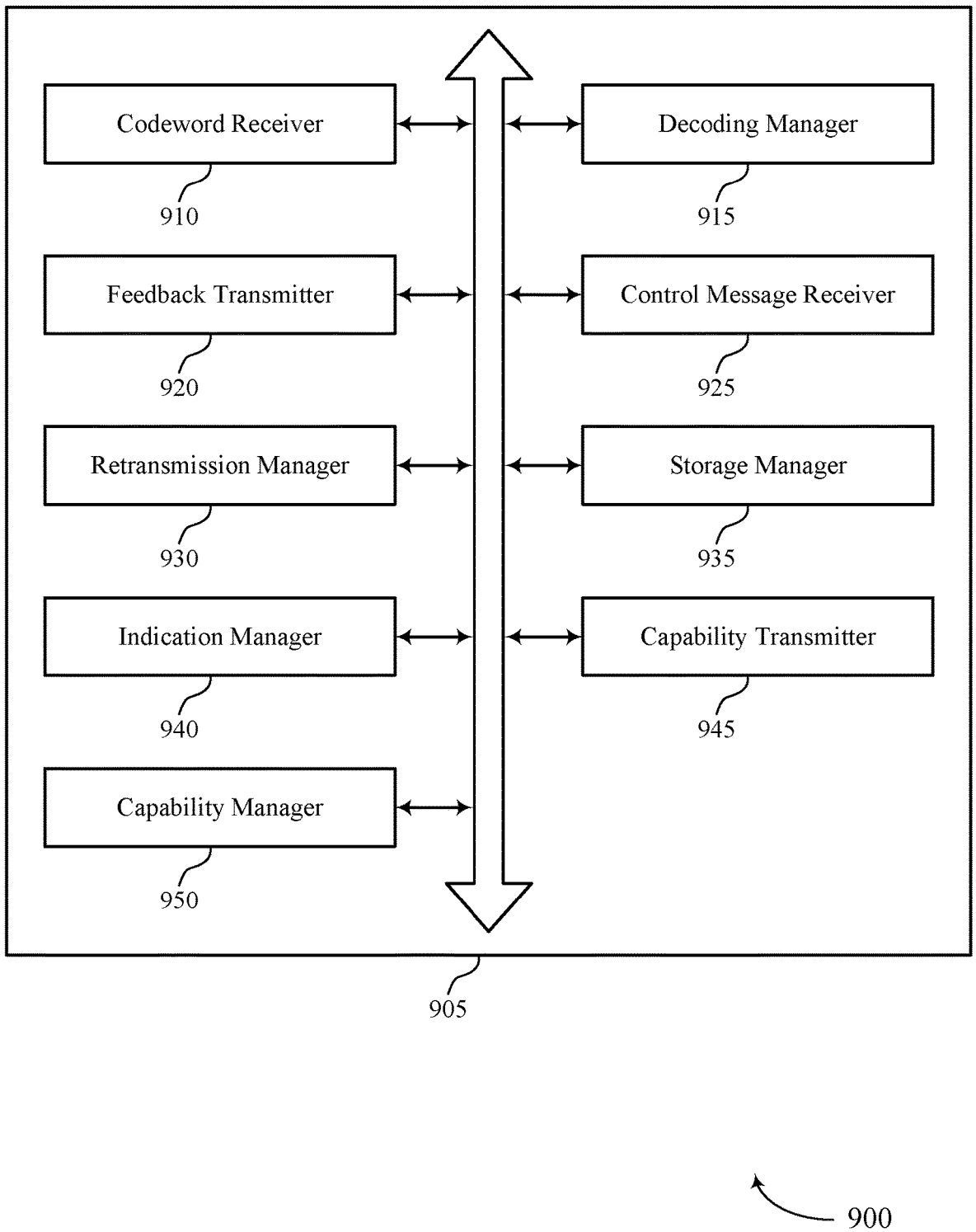
FIG. 9 shows a block diagram of a communications manager that supports hierarchical HARQ across different decoding levels in accordance with aspects of the present disclosure.

FIG. 9 shows a block diagram 900 of a communications manager 905 that supports hierarchical hybrid automatic repeat request across different decoding levels in accordance with aspects of the present disclosure. The communications manager 905 may be an example of aspects of a communications manager 715, a communications manager 815, or a communications manager 1010 described herein. The communications manager 905 may include a codeword receiver 910, a decoding manager 915, a feedback transmitter 920, a control message receiver 925, a retransmission manager 930, a storage manager 935, an indication manager 940, a capability transmitter 945, and a capability manager 950. Each of these modules may communicate, directly or indirectly, with one another (e.g., via one or more buses).

The codeword receiver 910 may receive, from a base station in a first transmission time interval, a code block group including a set of code blocks associated with a set of codewords, each codeword of the set of codewords associated with one of a set of decoding levels of a decoding procedure for the code block group.

In some examples, the codeword receiver 910 may receive, from the base station in a second transmission time interval and based on the transmitted feedback message, a retransmission of code blocks included in the failed code block group and corresponding to a code word of the lowest failing decoding level. In some examples, the codeword receiver 910 may receive, from the base station and in the second transmission time interval, code blocks associated with the third codeword based on the decoding procedure associated with the first codeword being successful in the first transmission time interval.

In some examples, the codeword receiver 910 may receive, from the base station and in the second transmission time interval, the third codeword and associated code blocks. In some cases, the first transmission time interval includes a first subframe or a first slot, and the second transmission time interval includes a second subframe or a second slot.

The decoding manager 915 may determine that the decoding procedure associated with one or more code blocks of the set of code blocks included in the code block group and associated with codewords of the set of codewords is unsuccessful. In some examples, the decoding manager 915 may determine that a decoding procedure all the code blocks from the addressed CBG and associated with a first codeword is successful and a decoding procedure of one or more code blocks associated with a second codeword is unsuccessful, where the first codeword is associated with a the first and lower decoding level first decoding level of the set of decoding levels and the second codeword is associated with the second and higher decoding level.

In some examples, the decoding manager 915 may decode, in the second transmission time interval and based on receiving the retransmission of the code blocks related to codewords of the lowest failing decoding level, and decoding of the code blocks of the lowest failing decoding level using the stored log likelihood ratio. In some examples, the decoding manager 915 may determine that a decoding procedure associated with the corresponding code blocks of a first codeword is unsuccessful.

In some examples, the decoding manager 915 may defer a decoding procedure associated with the corresponding code blocks of the second codeword, where the first codeword is associated with the lowest failing decoding level of the set of decoding levels and the second one or more codewords is associated with a second and higher decoding level of the set of decoding levels.

In some examples, the decoding manager 915 may successfully decode the retransmitted code blocks of the first codeword based on the stored log likelihood ratios and retransmissions. In some examples, the decoding manager 915 may decode, the corresponding code blocks related to the second codeword from the first transmission time interval based on a corresponding stored post processing sample.

In some examples, the decoding manager 915 may decode, in the second transmission time interval, the code blocks related to the third codeword based on receiving the third codeword and decoding the retransmission of the corresponding code blocks related to the first codeword on the second time interval that allow to the receiver to determine a code protected partitioning information for demodulation and decoding of the second decoding level codewords or corresponding code blocks.

The feedback transmitter 920 may transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels.

In some examples, the feedback transmitter 920 may transmit, to the base station, a second feedback message indicating that a decoding procedure associated with the third codeword and corresponding to it code blocks is successful. In some examples, the feedback transmitter 920 may transmit, to the base station, a second feedback message indicating that a decoding procedure associated with the retransmission of the corresponding code blocks related to the codewords of the lowest failing decoding level is successful after the retransmission.

The control message receiver 925 may receive, from the base station, a control message responsive to the feedback message including the second indicator indicating that the decoding procedure associated with the second codeword is unsuccessful, the control message including a retransmission indicator for the corresponding code blocks associated with the second decoding level and a new data indicator, where the new data indicator is associated with all the decoding levels excluding the second (e.g., failing) decoding level. In some examples, determining that the new data indicator includes an indication of a third codeword associated with the first decoding level or more codewords associated with all the other decoding levels excluding the failing decoding level.

In some examples, the control message receiver 925 may receive, from the base station, a control message responsive to the feedback message including the second indicator indicating that the decoding procedure associated with the first codeword is unsuccessful, the control message including a retransmission indicator and a new data indicator. In some examples, determining that the new data indicator includes an indication of a third codeword associated with the second decoding level or more codewords associated with all the other decoding levels excluding the failing decoding level.

In some cases, the control message includes a downlink control information.

The retransmission manager 930 may determine that the retransmission indicator includes a hybrid automatic repeat request process number and a redundancy version associated with the second codeword, where receiving the retransmission of the codeword of the second decoding level includes receiving retransmission of the corresponding code blocks of the second codeword. In some cases, the retransmission of codewords of the lowest failing decoding level includes retransmission of all the corresponding code blocks related to the codeword of the lowest failing decoding level, where the corresponding code blocks are included in the corresponding code blocks group.

The storage manager 935 may store a log likelihood ratio associated with the code blocks related to codeword of the lowest failing decoding level and a hybrid automatic repeat request process identifier, and an indication associated with the decoding level for which the decoding procedure was unsuccessful. In some examples, the storage manager 935 may store one or more post processing samples associated with a code block group including the code blocks of a second codeword based on determining that the decoding procedure associated with the first codeword is unsuccessful.

In some examples, storing a log likelihood ratios associated with the corresponding code blocks related to the first codeword based on determining that the decoding procedure associated with the first codeword is unsuccessful, where receiving the retransmission of the corresponding code blocks of the codeword of the lowest failing decoding level includes receiving the retransmission of the corresponding code blocks of the first codeword.

The indication manager 940 may set one or more bits associated with the second indicator of the decoding level, where a value of the one or more bits identifies the lowest decoding level associated with the code blocks for which the decoding procedure was unsuccessful.

In some cases, the one or more bits include one bit that is set to indicate the lowest decoding level of the set of decoding levels, where the set of decoding levels include two decoding levels. In some cases, the one or more bits include two or more bits that are set to indicate the lowest decoding level of the set of decoding levels, where the set of decoding levels include three or more decoding levels.

The capability transmitter 945 may transmit, to the base station, an indication of a capability of the UE to support hierarchical acknowledgement feedback and a number of hybrid automatic repeat request processes across the set of decoding levels, where receiving the retransmission of the codeword of the lowest failing decoding level and new codewords associated with all the other decoding levels is based on the capability of the UE. In some examples, the capability transmitter 945 may transmit, to the base station, an indication of a capability of the UE to support a maximum number of hierarchical hybrid automatic repeat request buffers associated with the number of hybrid automatic repeat request processes. The capability manager 950 may determine a capability of the UE. The UE may be configured to support multi-level coding with a multi-level sequential demodulation and decoding scheme.

In some cases, the codeword receiver 910, the decoding manager 915, the feedback transmitter 920, the control message receiver 925, the retransmissions manager 930, the storage manager 935, the indication manager 940, the capability transmitter 945, and the capability manager 950 may each be or be at least a part of a processor (e.g., a transceiver processor, or a radio processor, or a transmitter processor, or a receiver processor). The processor may be coupled with memory and execute instructions store in the memory that enable the processor to or facilitate the features of the codeword receiver 910, the decoding manager 915, the feedback transmitter 920, the control message receiver 925, the retransmissions manager 930, the storage manager 935, the indication manager 940, the capability transmitter 945, and the capability manager 950 discussed herein.

Figure 10:
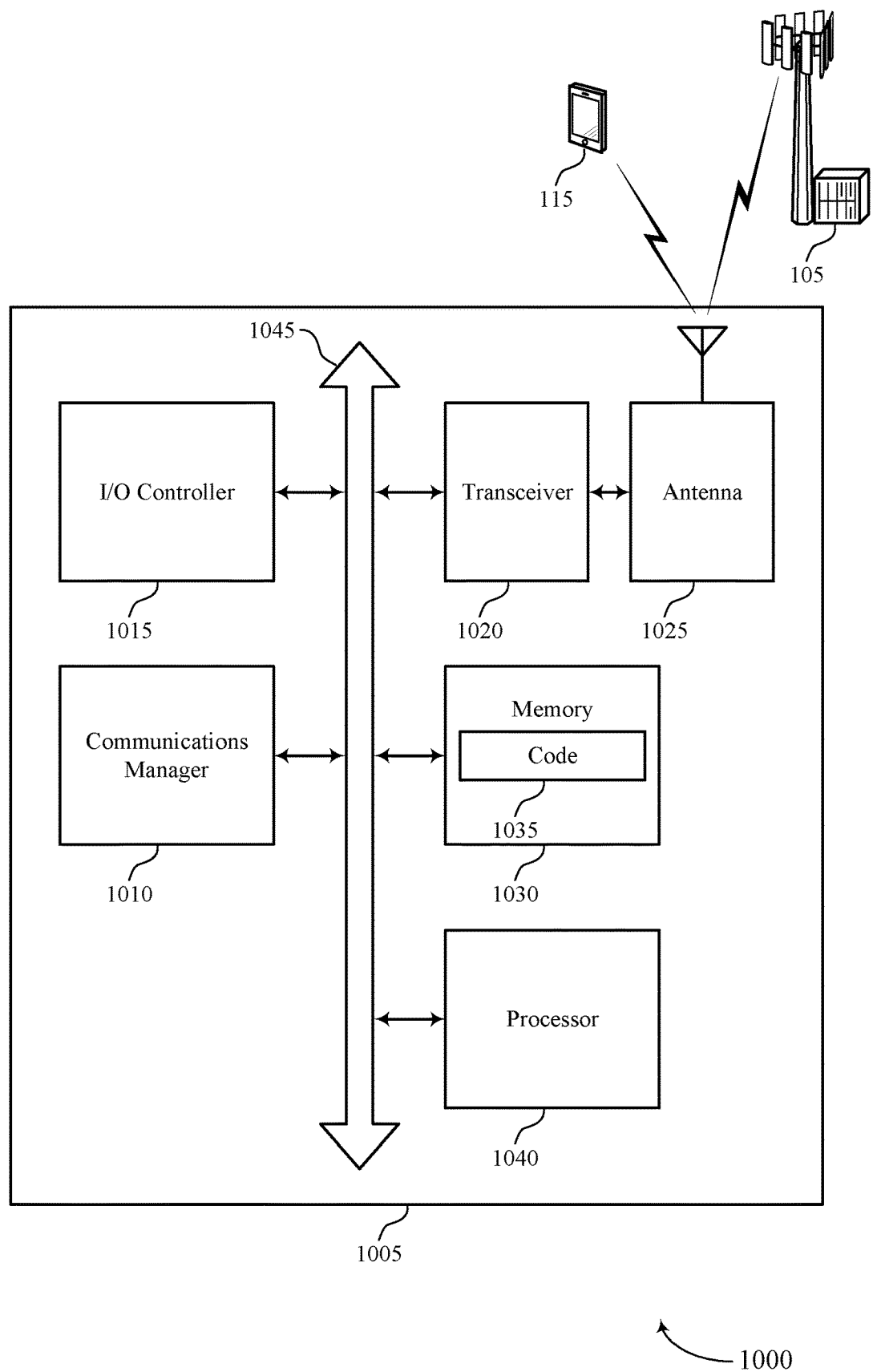
FIG. 10 shows a diagram of a system including a device that supports hierarchical HARQ across different decoding levels in accordance with aspects of the present disclosure.

FIG. 10 shows a diagram of a system 1000 including a device 1005 that supports hierarchical hybrid automatic repeat request across different decoding levels in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station in a first transmission time interval, a code block group including a set of code blocks associated with a set of codewords, each codeword of the set of codewords associated with one of a set of decoding levels of a decoding procedure for the code block group, receive, from the base station in a second transmission time interval and based on the transmitted feedback message, a retransmission of code blocks included in the failed code block group and corresponding to a code word of the lowest failing decoding level, determine that the decoding procedure associated with one or more code blocks of the set of code blocks included in the code block group and associated with codewords of the set of codewords is unsuccessful, and transmit, to the base station, a feedback message including a first indicator that the decoding procedure was unsuccessful for the code block group and a second indicator of a lowest decoding level of the one or more code blocks for which the decoding procedure was unsuccessful, the lowest decoding level being one of the set of decoding levels.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting hierarchical hybrid automatic repeat request across different decoding levels).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
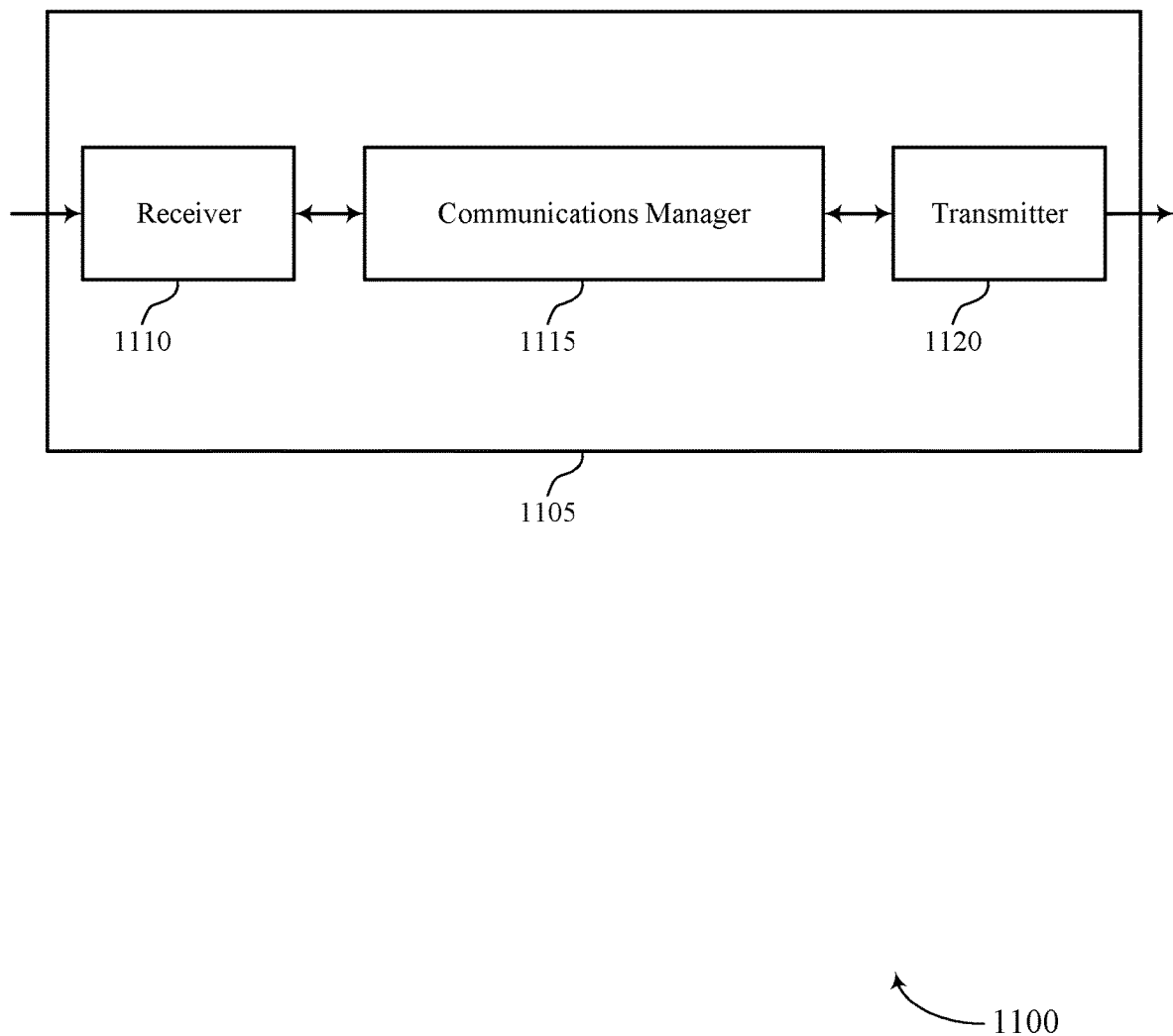
FIGS. 11 and 12 show block diagrams of devices that support hierarchical HARQ across different decoding levels in accordance with aspects of the present disclosure.

FIG. 11 shows a block diagram 1100 of a device 1105 that supports hierarchical hybrid automatic repeat request across different decoding levels in accordance with aspects of the present disclosure. The device 1105 may be an example of aspects of a base station 105 as described herein. The device 1105 may include a receiver 1110, a communications manager 1115, and a transmitter 1120. The device 1105 may also include one or more processors, memory coupled with the one or more processors, and instructions stored in the memory that are executable by the one or more processors to enable the one or more processors to perform the hierarchical HARQ across different decoding levels features discussed herein. Each of these components may be in communication with one another (e.g., via one or more buses).

The receiver 1110 may receive information such as packets, user data, or control information associated with various information channels (e.g., control channels, data channels, and information related to hierarchical hybrid automatic repeat request across different decoding levels, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE and in a first transmission time interval, a code block group including a set of code blocks associated with a set of codewords, each codeword of the set of codewords associated with one of a set of decoding levels of a decoding procedure for the code block group, transmit, to the UE in a second transmission time interval and based on the received feedback message, a retransmission of the corresponding code blocks included in the failed code block group and corresponding to the codeword of the lowest failing decoding level, and receive, from the UE, a feedback message including a first indicator that a decoding procedure was unsuccessful for the code block group and a second indicator of a lowest decoding level of the one or more code blocks for which the decoding procedure was unsuccessful, the lowest decoding level being one of the set of decoding levels. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
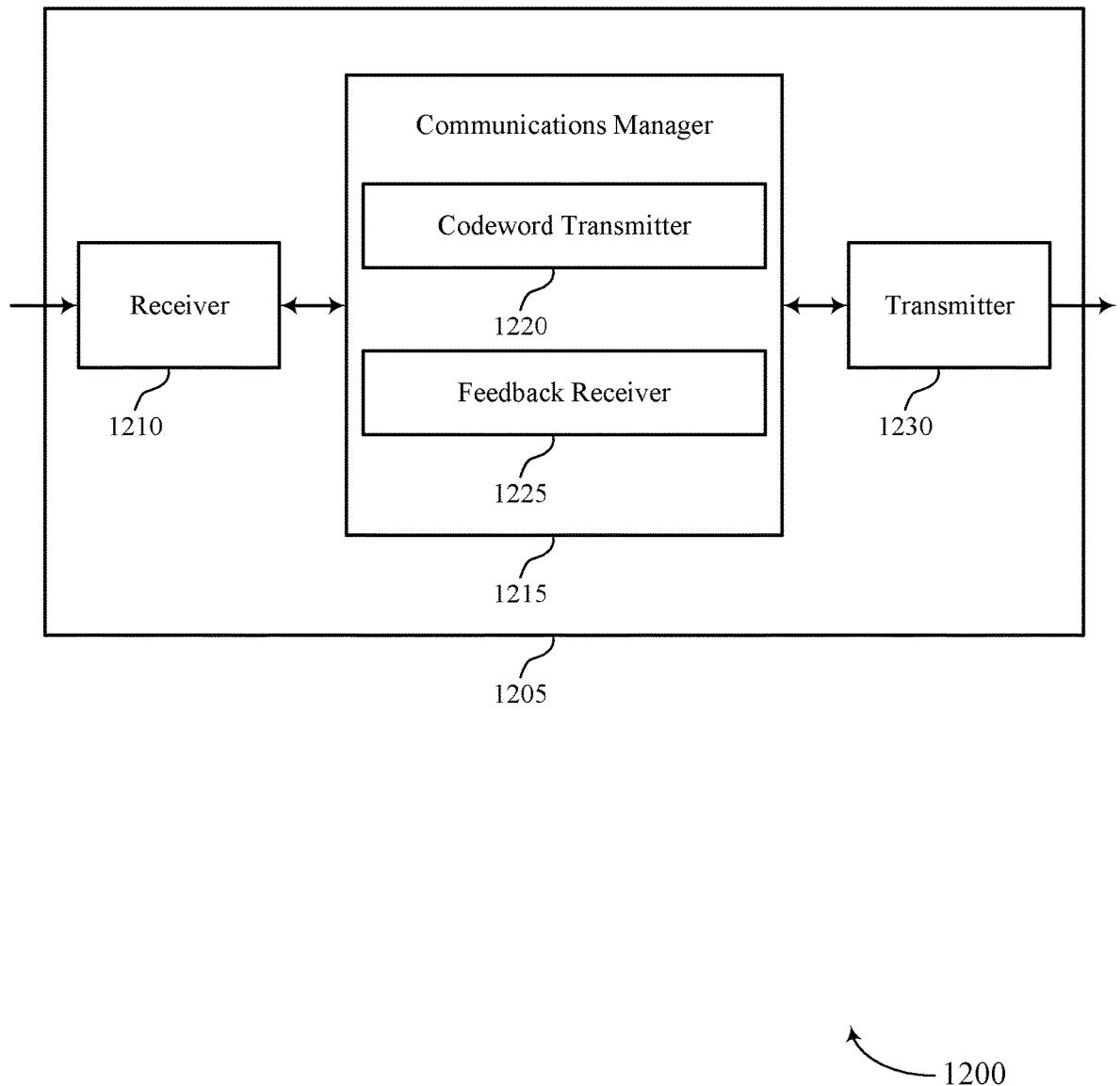

FIG. 12 shows a block diagram 1200 of a device 1205 that supports hierarchical hybrid automatic repeat request across different decoding levels in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to hierarchical hybrid automatic repeat request across different decoding levels, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a codeword transmitter 1220 and a feedback receiver 1225. The communications manager 1215 may be an example of aspects of the communications manager 1410 described herein.

The codeword transmitter 1220 may transmit, to a UE and in a first transmission time interval, a code block group including a set of code blocks associated with a set of codewords, each codeword of the set of codewords associated with one of a set of decoding levels of a decoding procedure for the code block group and transmit, to the UE in a second transmission time interval and based on the received feedback message, a retransmission of the corresponding code blocks included in the failed code block group and corresponding to the codeword of the lowest failing decoding level.

The feedback receiver 1225 may receive, from the UE, a feedback message including a first indicator that a decoding procedure was unsuccessful for the code block group and a second indicator of a lowest decoding level of the one or more code blocks for which the decoding procedure was unsuccessful, the lowest decoding level being one of the set of decoding levels.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

In some cases, the codeword transmitter 1220 and the feedback receiver 1225 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the codeword transmitter 1220 and the feedback receiver 1225 discussed herein. A transceiver processor may be collocated with and/or communicate with (e.g., direct the operations of) a transceiver of the device 1205. A radio processor may be collocated with and/or communication with (e.g., direct the operations of) a radio (e.g., an NR radio, an LTE radio, a Wi-Fi radio) of the device. A transmitter processor may be collocated with and/or communicate with (e.g., direct the operations of) a transmitter of the device 1205. A receiver processor may be collocated with and/or communicate with (e.g., direct the operations of) a receiver of the device 1205.

Figure 13:
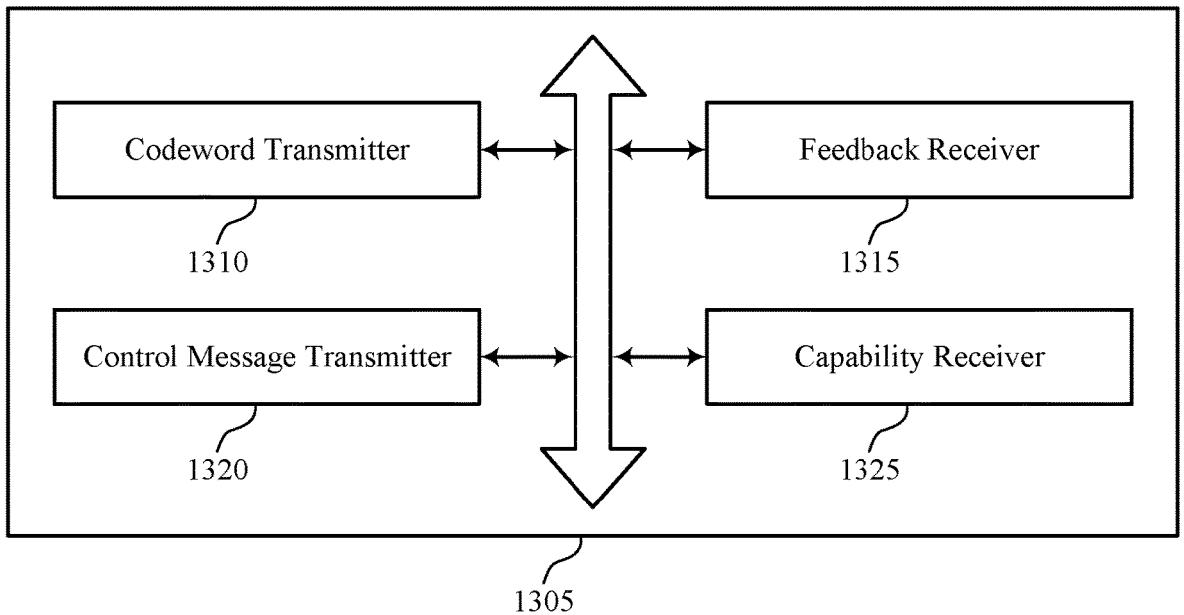
FIG. 13 shows a block diagram of a communications manager that supports hierarchical HARQ across different decoding levels in accordance with aspects of the present disclosure.

FIG. 13 shows a block diagram 1300 of a communications manager 1305 that supports hierarchical hybrid automatic repeat request across different decoding levels in accordance with aspects of the present disclosure. The communications manager 1305 may be an example of aspects of a communications manager 1115, a communications manager 1215, or a communications manager 1410 described herein. The communications manager 1305 may include a codeword transmitter 1310, a feedback receiver 1315, a control message transmitter 1320, and a capability receiver 1325. Each of these modules may communicate, directly or indirectly, with one another (e.g., via one or more buses).

The codeword transmitter 1310 may transmit, to a UE and in a first transmission time interval, a code block group including a set of code blocks associated with a set of codewords, each codeword of the set of codewords associated with one of a set of decoding levels of a decoding procedure for the code block group. In some examples, the codeword transmitter 1310 may transmit, to the UE in a second transmission time interval and based on the received feedback message, a retransmission of the corresponding code blocks included in the failed code block group and corresponding to the codeword of the lowest failing decoding level.

In some examples, transmitting, to the UE and in the second transmission time interval, code blocks associated with a third codeword based on the decoding procedure associated with the first codeword being successful in the first transmission time interval, where the new data indicator includes an indication of the third codeword associated with the first decoding level and the corresponding to it code blocks. In some cases, the retransmission of codeword of the lowest failing decoding level includes retransmission of all the corresponding code blocks associated with a codewords of the lowest failing decoding level, where the corresponding code blocks are included in the corresponding code blocks group.

In some cases, the base station is configured to support multi-level coding. In some cases, the first transmission time interval includes a first subframe or a first slot, and the second transmission time interval includes a second subframe or a second slot.

The feedback receiver 1315 may receive, from the UE, a feedback message including a first indicator that a decoding procedure was unsuccessful for the code block group and a second indicator of a lowest decoding level of the one or more code blocks for which the decoding procedure was unsuccessful, the lowest decoding level being one of the set of decoding levels.

In some examples, the feedback receiver 1315 may determine that a decoding procedure of one or more code blocks associated with a first codeword is successful and a decoding procedure of one or more code blocks associated with a second codeword is unsuccessful, where the first codeword is associated with a first and lower decoding level of the set of decoding levels and the second codeword is associated with the second and higher decoding level of the set of decoding levels.

In some examples, the feedback receiver 1315 may receive, from the UE, a second feedback message indicating that a decoding procedure associated with the third codeword is successful. In some examples, the feedback receiver 1315 may determine that a decoding procedure associated with the corresponding code blocks of a first codeword is unsuccessful, where the first codeword is associated with the lowest failing decoding level of the set of decoding levels.

The control message transmitter 1320 may transmit, to the UE, a control message responsive to the feedback message including the second indicator indicating that the decoding procedure associated with the second codeword is unsuccessful, the control message including a retransmission indicator for the corresponding code blocks associated with the second decoding level and a new data indicator, where the new data indicator is associated with one or more decoding levels excluding the failing decoding level.

In some examples, including a hybrid automatic repeat request process number and a redundancy version associated with the second codeword in the retransmission indicator, where transmitting the retransmission of the codeword of the lowest failing decoding level includes transmitting retransmission of the corresponding code blocks of the second codeword.

In some examples, transmitting, to the UE, a control message responsive to the feedback message including the second indicator indicating that the decoding procedure associated with the code blocks corresponding to the codeword of the lowest failing decoding level is unsuccessful, the control message including a retransmission indicator and a new data indicator, where the retransmission indicator indicates the retransmission of the corresponding code blocks associated with the first codeword and the new data indicator includes an indication of a third codeword and corresponding to it code blocks associated with a second decoding level. In some cases, the control message includes a downlink control information.

The capability receiver 1325 may receive, from the UE, an indication of a capability of the UE to support hierarchical acknowledgement feedback and a number of hybrid automatic repeat request processes across the set of decoding levels, where transmitting the retransmission of the codeword of the lowest failing decoding level and a new codeword associated with all the remaining decoding levels is based on the capability of the UE.

In some examples, the capability receiver 1325 may receive, from the UE, an indication of a capability of the UE to support a maximum number of hierarchical hybrid automatic repeat request buffers associated with the number of hybrid automatic repeat request processes.

In some cases, the codeword transmitter 1310, the feedback receiver 1315, the control message transmitter 1320, and the capability receiver 1325 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the codeword transmitter 1310, the feedback receiver 1315, the control message transmitter 1320, and the capability receiver 1325 discussed herein.

Figure 14:
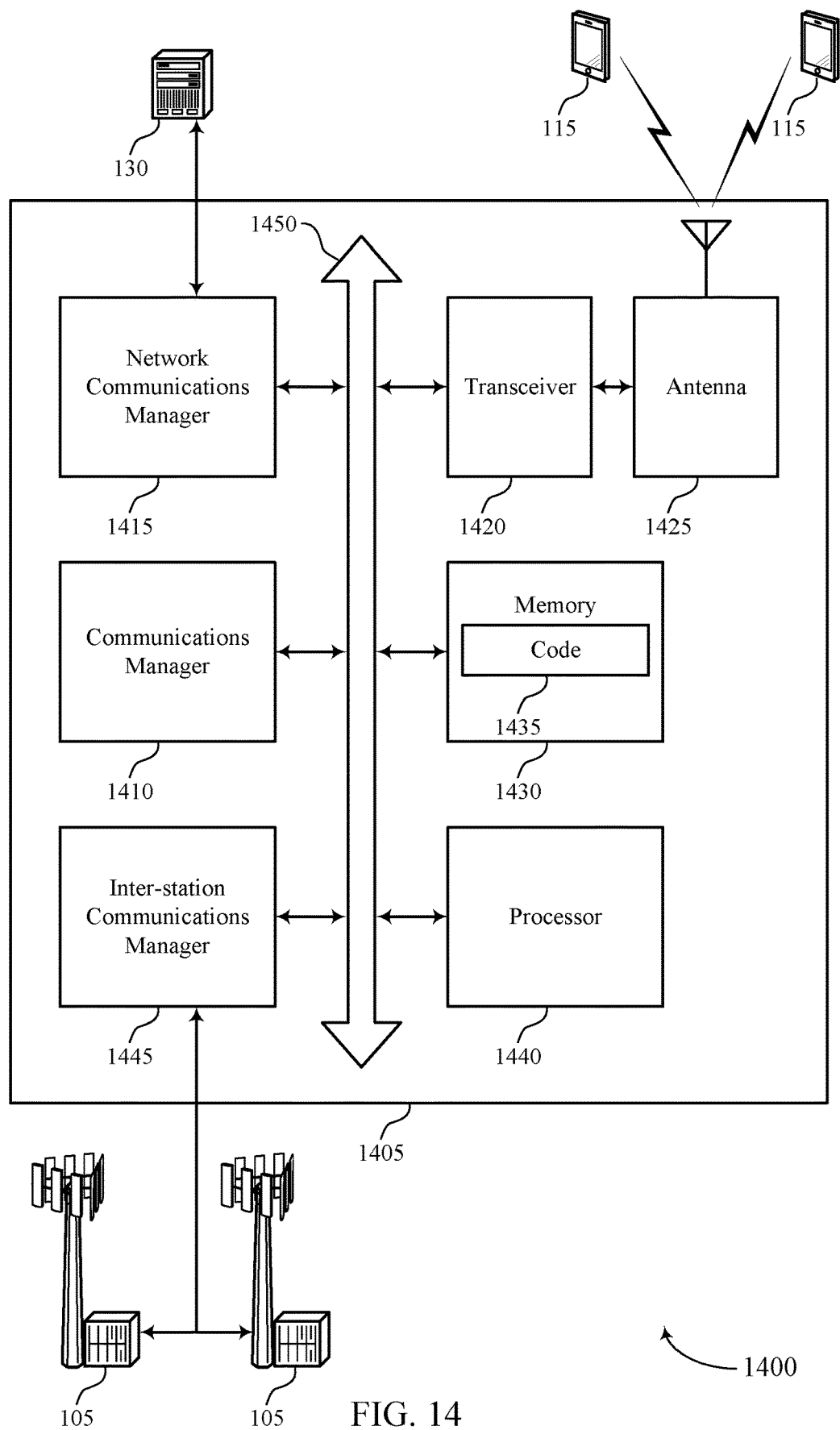
FIG. 14 shows a diagram of a system including a device that supports hierarchical HARQ across different decoding levels in accordance with aspects of the present disclosure.

FIG. 14 shows a diagram of a system 1400 including a device 1405 that supports hierarchical hybrid automatic repeat request across different decoding levels in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE and in a first transmission time interval, a code block group including a set of code blocks associated with a set of codewords, each codeword of the set of codewords associated with one of a set of decoding levels of a decoding procedure for the code block group, transmit, to the UE in a second transmission time interval and based on the received feedback message, a retransmission of the corresponding code blocks included in the failed code block group and corresponding to the codeword of the lowest failing decoding level, and receive, from the UE, a feedback message including a first indicator that a decoding procedure was unsuccessful for the code block group and a second indicator of a lowest decoding level of the one or more code blocks for which the decoding procedure was unsuccessful, the lowest decoding level being one of the set of decoding levels.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting hierarchical hybrid automatic repeat request across different decoding levels).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
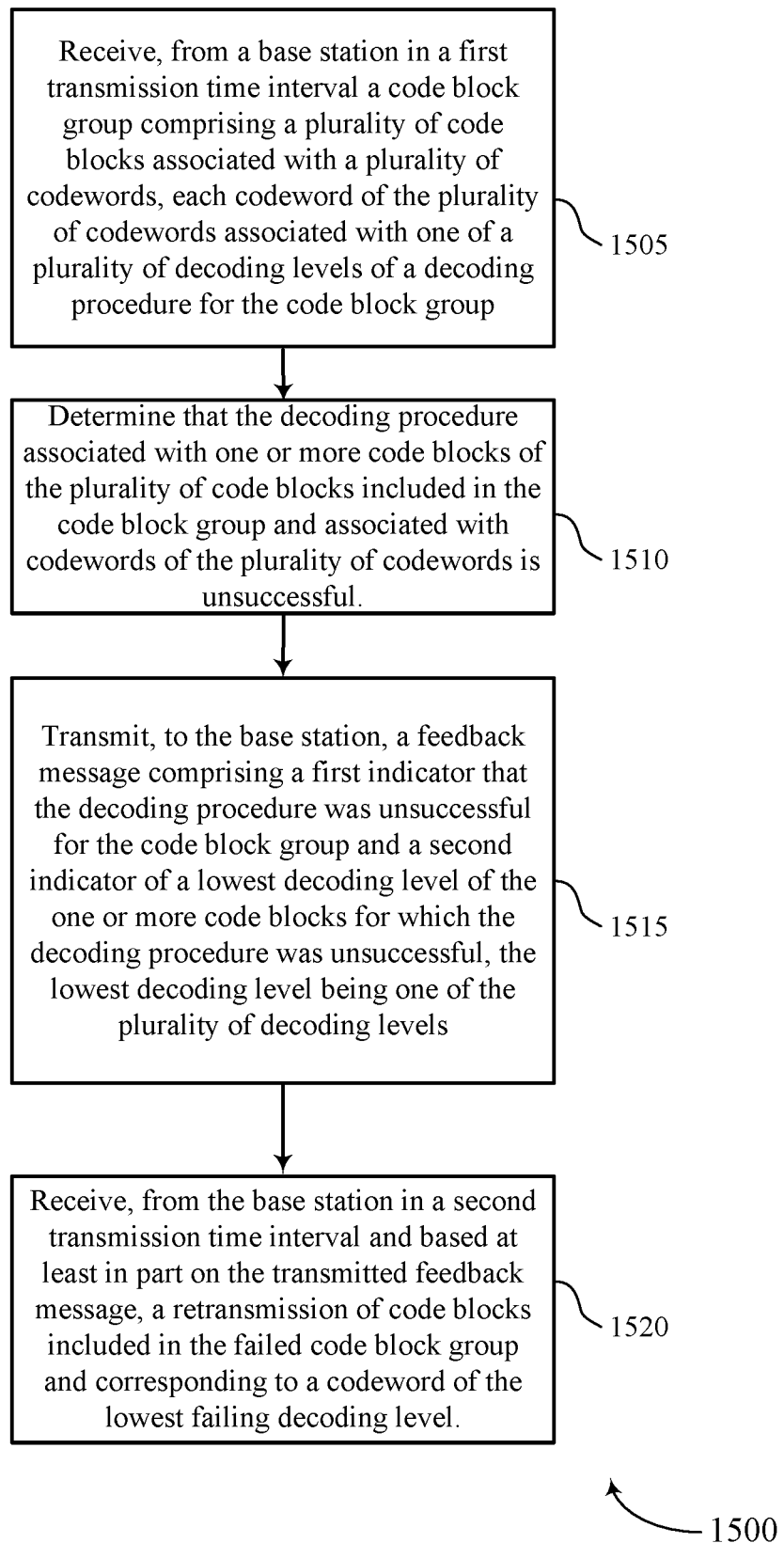
FIGS. 15 through 18 show flowcharts illustrating methods that support hierarchical HARQ across different decoding levels in accordance with aspects of the present disclosure.

FIG. 15 shows a flowchart illustrating a method 1500 that supports hierarchical HARQ across different decoding levels in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station in a first transmission time interval, a CBG comprising a plurality of code blocks associated with a plurality of codewords, each codeword of the plurality of codewords associated with one of a plurality of decoding levels of a decoding procedure for the code block group. The operations of 1505 may be performed according to the methods described herein. In some examples, aspects of the operations of 1505 may be performed by a codeword receiver as described with reference to FIGS. 7 through 10.

At 1510, the UE may determine that the decoding procedure associated with one or more code blocks of the plurality of code blocks included in the code block group and associated with codewords of the plurality of codewords is unsuccessful. The operations of 1510 may be performed according to the methods described herein. In some examples, aspects of the operations of 1510 may be performed by a decoding manager as described with reference to FIGS. 7 through 10.

At 1515, the UE may transmit, to the base station, a feedback message comprising a first indicator that the decoding procedure was unsuccessful for the code block group and a second indicator of a lowest decoding level of the one or more code blocks for which the decoding procedure was unsuccessful, the lowest decoding level being one of the plurality of decoding levels. The operations of 1515 may be performed according to the methods described herein. In some examples, aspects of the operations of 1515 may be performed by a feedback transmitter as described with reference to FIGS. 7 through 10.

At 1520, the UE may receive, from the base station in a second transmission time interval and based at least in part on the transmitted feedback message, a retransmission of code blocks included in the failed code block group and corresponding to a codewords of the lowest failing decoding level. The operations of 1520 may be performed according to the methods described herein. In some examples, aspects of the operations of 1520 may be performed by a codeword receiver as described with reference to FIGS. 7 through 10.

Figure 16:
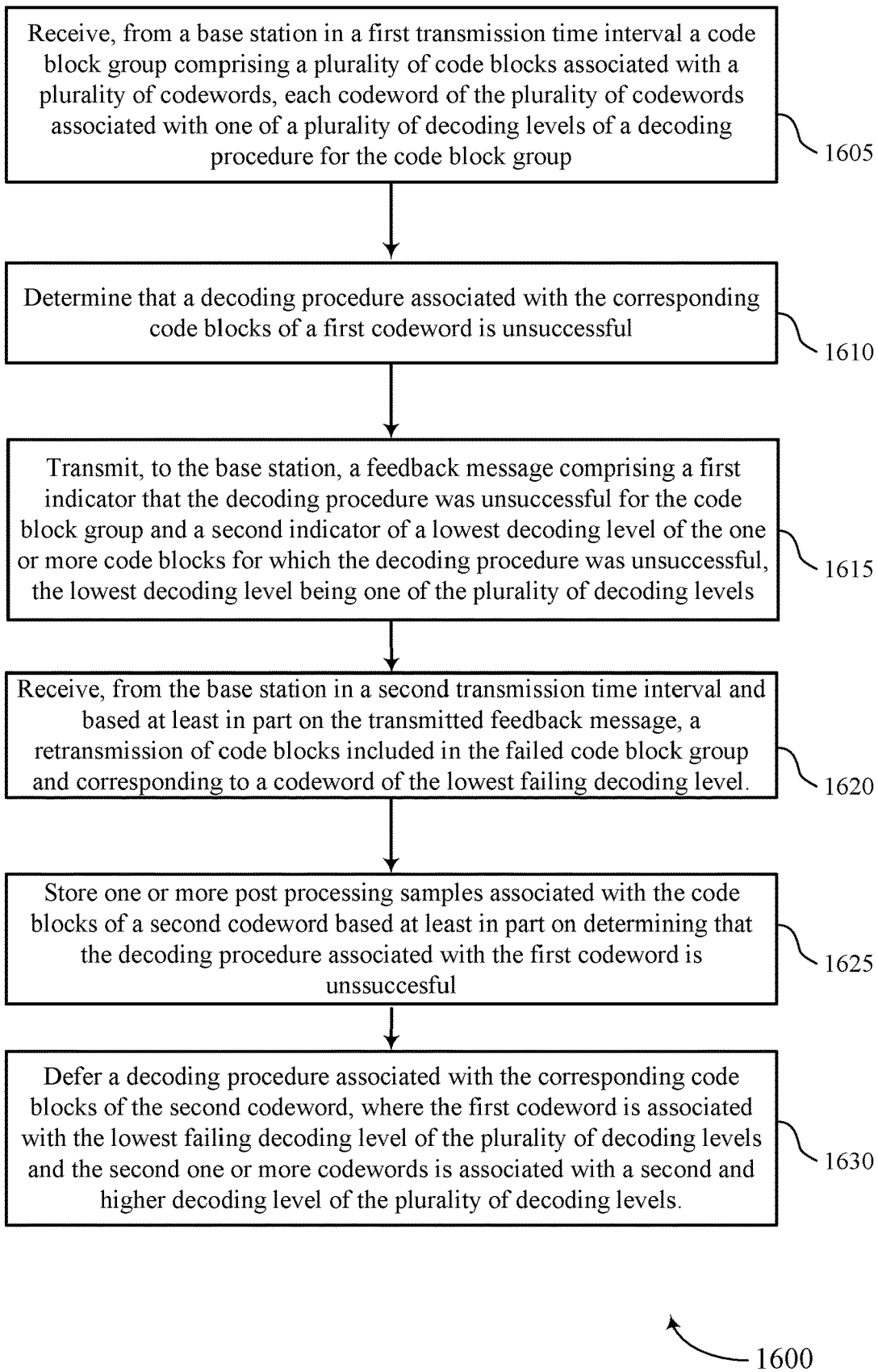

FIG. 16 shows a flowchart illustrating a method 1600 that supports hierarchical HARQ across different decoding levels in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station in a first transmission time interval, a CBG comprising a plurality of code blocks associated with a plurality of codewords, each codeword of the plurality of codewords associated with one of a plurality of decoding levels of a decoding procedure for the code block group. The operations of 1605 may be performed according to the methods described herein. In some examples, aspects of the operations of 1605 may be performed by a codeword receiver as described with reference to FIGS. 7 through 10.

At 1610, the UE may determine that a decoding procedure associated with the corresponding code blocks of a first codewords is unsuccessful. The operations of 1610 may be performed according to the methods described herein. In some examples, aspects of the operations of 1610 may be performed by a decoding manager as described with reference to FIGS. 7 through 10.

At 1615, the UE may transmit, to the base station, a feedback message comprising a first indicator that the decoding procedure was unsuccessful for the code block group and a second indicator of a lowest decoding level of the one or more code blocks for which the decoding procedure was unsuccessful, the lowest decoding level being one of the plurality of decoding levels. The operations of 1615 may be performed according to the methods described herein. In some examples, aspects of the operations of 1615 may be performed by a feedback transmitter as described with reference to FIGS. 7 through 10.

At 1620, the UE may receive, from the base station in a second transmission time interval and based at least in part on the transmitted feedback message, a retransmission of code blocks included in the failed code block group and corresponding to a codewords of the lowest failing decoding level. The operations of 1620 may be performed according to the methods described herein. In some examples, aspects of the operations of 1620 may be performed by a codeword receiver as described with reference to FIGS. 7 through 10.

At 1625, the UE may store one or more post processing samples associated with the code blocks of a second codeword based at least in part on determining that the decoding procedure associated with the first codewords is unsuccessful. The operations of 1625 may be performed according to the methods described herein. In some examples, aspects of the operations of 1625 may be performed by a storage manager as described with reference to FIGS. 7 through 10.

At 1630, the UE may defer a decoding procedure associated with the corresponding code blocks of the second codeword, where the first codeword is associated with the lowest failing decoding level of the plurality of decoding levels and the second one or more codewords is associated with a second and higher decoding level of the plurality of decoding levels. The operations of 1630 may be performed according to the methods described herein. In some examples, aspects of the operations of 1630 may be performed by a decoding manager as described with reference to FIGS. 7 through 10.

Figure 17:
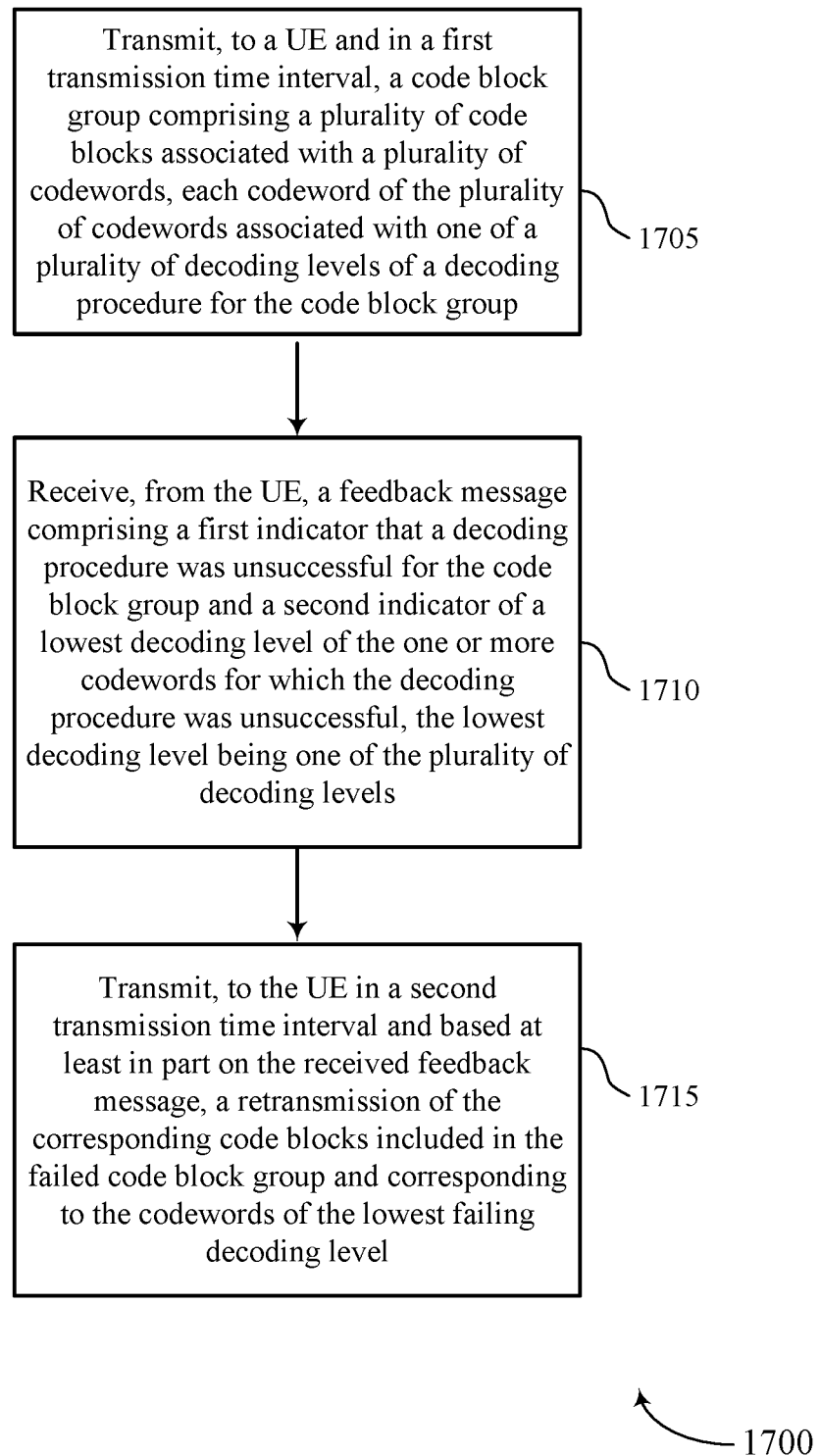

FIG. 17 shows a flowchart illustrating a method 1700 that supports hierarchical HARQ across different decoding levels in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE and in a first transmission time interval, a code block group comprising a plurality of code blocks associated with a plurality of codewords, each codeword of the plurality of codewords associated with one of a plurality of decoding levels of a decoding procedure for the code block group. The operations of 1705 may be performed according to the methods described herein. In some examples, aspects of the operations of 1705 may be performed by a codeword transmitter as described with reference to FIGS. 11 through 14.

At 1710, the base station may receive, from the UE, a feedback message comprising a first indicator that a decoding procedure was unsuccessful for the code block group and a second indicator of a lowest decoding level of the one or more codewords for which the decoding procedure was unsuccessful, the lowest decoding level being one of the plurality of decoding levels. The operations of 1710 may be performed according to the methods described herein. In some examples, aspects of the operations of 1710 may be performed by a feedback receiver as described with reference to FIGS. 11 through 14.

At 1715, the base station may transmit, to the UE in a second transmission time interval and based at least in part on the received feedback message, a retransmission of the corresponding code blocks included in the failed code block group and corresponding to the codewords of the lowest failing decoding level. The operations of 1715 may be performed according to the methods described herein. In some examples, aspects of the operations of 1715 may be performed by a codeword transmitter as described with reference to FIGS. 11 through 14.

Figure 18:
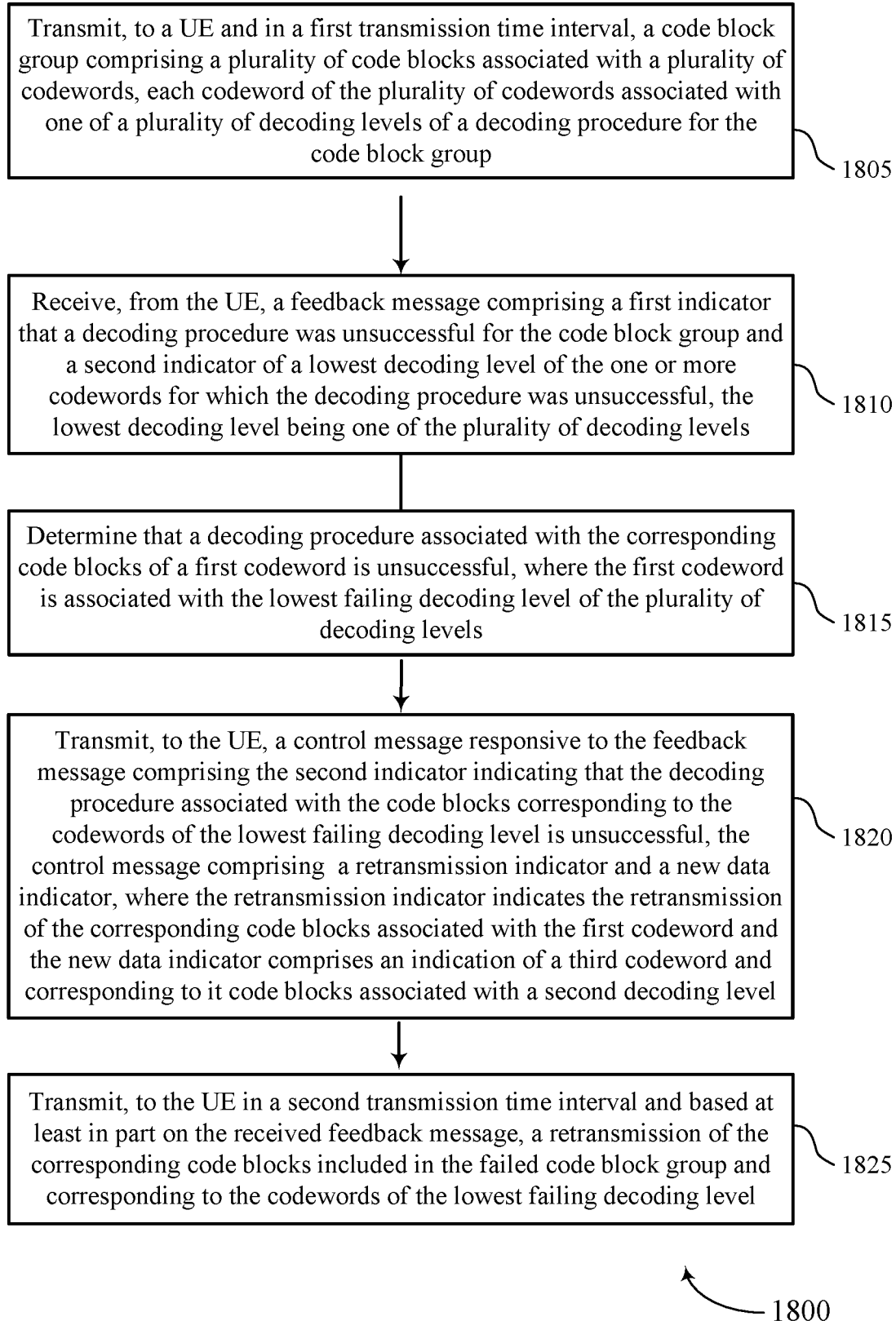

FIG. 18 shows a flowchart illustrating a method 1800 that supports hierarchical HARQ across different decoding levels in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE and in a first transmission time interval, a code block group comprising a plurality of code blocks associated with a plurality of codewords, each codeword of the plurality of codewords associated with one of a plurality of decoding levels of a decoding procedure for the code block group. The operations of 1805 may be performed according to the methods described herein. In some examples, aspects of the operations of 1805 may be performed by a codeword transmitter as described with reference to FIGS. 11 through 14.

At 1810, the base station may receive, from the UE, a feedback message comprising a first indicator that a decoding procedure was unsuccessful for the code block group and a second indicator of a lowest decoding level of the one or more codewords for which the decoding procedure was unsuccessful, the lowest decoding level being one of the plurality of decoding levels. The operations of 1810 may be performed according to the methods described herein. In some examples, aspects of the operations of 1810 may be performed by a feedback receiver as described with reference to FIGS. 11 through 14.

At 1815, the base station may determine that a decoding procedure associated with the corresponding code blocks of a first codeword is unsuccessful, where the first codeword is associated with the lowest failing decoding level of the plurality of decoding levels. The operations of 1815 may be performed according to the methods described herein. In some examples, aspects of the operations of 1815 may be performed by a feedback receiver as described with reference to FIGS. 11 through 14.

At 1820, the base station may transmit, to the UE, a control message responsive to the feedback message comprising the second indicator indicating that the decoding procedure associated with the code blocks corresponding to the codewords of the lowest failing decoding level is unsuccessful, the control message comprising a retransmission indicator and a new data indicator, where the retransmission indicator indicates the retransmission of the corresponding code blocks associated with the first codeword and the new data indicator comprises an indication of a third codeword and corresponding to it code blocks associated with a second decoding level. The operations of 1820 may be performed according to the methods described herein. In some examples, aspects of the operations of 1820 may be performed by a control message transmitter as described with reference to FIGS. 11 through 14.

At 1825, the base station may transmit, to the UE in a second transmission time interval and based at least in part on the received feedback message, a retransmission of the corresponding code blocks included in the failed code block group and corresponding to the codewords of the lowest failing decoding level. The operations of 1825 may be performed according to the methods described herein. In some examples, aspects of the operations of 1825 may be performed by a codeword transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a base station in a first transmission time interval, a code block group comprising a plurality of code blocks associated with a plurality of codewords, each codeword of the plurality of codewords associated with one of a plurality of decoding levels of a decoding procedure for the code block group;
determining that the decoding procedure associated with one or more code blocks of the plurality of code blocks included in the code block group and associated with codewords of the plurality of codewords is unsuccessful, wherein the decoding procedure comprises decoding at least a first decoding level of the plurality of decoding levels associated with a first coding rate prior to a second decoding level associated with a second coding rate, and wherein the first coding rate is a lower coding rate than the second coding rate;
transmitting, to the base station, a feedback message comprising a first indicator that the decoding procedure was unsuccessful for the code block group and a second indicator of a lowest decoding level of the one or more code blocks for which the decoding procedure was unsuccessful, the lowest decoding level being one of the plurality of decoding levels; and
receiving, from the base station in a second transmission time interval and based at least in part on the transmitted feedback message, a retransmission of code blocks included in the code block group and corresponding to a codeword of the lowest decoding level.

2. The method of claim 1, further comprising:
determining that a decoding procedure of one or more code blocks associated with a first codeword is successful and a decoding procedure of one or more code blocks associated with a second codeword is unsuccessful, wherein the first codeword is associated with the first decoding level comprising the lower decoding level of the plurality of decoding levels and the second codeword is associated with the second decoding level comprising a higher decoding level.

3. The method of claim 2, further comprising:
receiving, from the base station, a control message responsive to the feedback message comprising the second indicator indicating that the decoding procedure associated with the second codeword is unsuccessful, the control message comprising a retransmission indicator for corresponding code blocks associated with the second decoding level and a new data indicator, wherein the new data indicator is associated with one or more decoding levels lower than the second decoding level.

4. The method of claim 3, further comprising:
determining that the new data indicator comprises an indication of a third codeword associated with the first decoding level;
receiving, from the base station and in the second transmission time interval, code blocks associated with the third codeword based at least in part on the decoding procedure associated with the first codeword being successful in the first transmission time interval; and
transmitting, to the base station, a second feedback message indicating that a decoding procedure associated with the third codeword and corresponding to it code blocks is successful.

5. The method of claim 3, further comprising:
determining that the retransmission indicator comprises a hybrid automatic repeat request process number and a redundancy version associated with the second codeword, wherein receiving the retransmission of the codeword of the second decoding level comprises receiving a retransmission of the corresponding code blocks of the second codeword.

6. The method of claim 1, further comprising:
storing a log likelihood ratio associated with the code blocks related to codeword of the lowest decoding level and a hybrid automatic repeat request process identifier, and an indication associated with a decoding level for which the decoding procedure was unsuccessful;
decoding, in the second transmission time interval and based at least in part on receiving the retransmission of the code blocks related to a codeword of the lowest decoding level, and decoding of the code blocks of the lowest decoding level using the stored log likelihood ratio; and
transmitting, to the base station, a second feedback message indicating that a decoding procedure associated with the retransmission of corresponding code blocks related to the codeword of the lowest decoding level is successful after the retransmission.

7. The method of claim 1, further comprising:
determining that a decoding procedure associated with corresponding code blocks of a first codeword is unsuccessful;
storing one or more post processing samples associated with the code blocks of a second codeword based at least in part on determining that the decoding procedure associated with the first codeword is unsuccessful; and
deferring a decoding procedure associated with corresponding code blocks of the second codeword, wherein the first codeword is associated with the lowest decoding level of the plurality of decoding levels and the second codeword is associated with a second and higher decoding level of the plurality of decoding levels.

8. The method of claim 7, further comprising:
storing a log likelihood ratios associated with corresponding code blocks of the first codeword based at least in part on determining that the decoding procedure associated with the first codeword is unsuccessful, wherein receiving the retransmission of corresponding code blocks of the codeword of the lowest decoding level comprises receiving the retransmission of the corresponding code blocks of the first codeword; and
successfully decoding retransmitted code blocks of the first codeword based at least in part on the stored log likelihood ratios and retransmissions.

9. The method of claim 7, further comprising:
receiving, from the base station, a control message responsive to the feedback message comprising the second indicator indicating that the decoding procedure associated with the first codeword is unsuccessful, the control message comprising a retransmission indicator and a new data indicator.

10. The method of claim 9, further comprising:
determining that the new data indicator comprises an indication of a third codeword associated with the second decoding level; and
receiving, from the base station and in the second transmission time interval, the third codeword and associated code blocks.

11. The method of claim 10, further comprising:
decoding, the corresponding code blocks related to the second codeword from the first transmission time interval based at least in part on a corresponding stored post processing sample and decoded partition information associated with the corresponding code blocks related to the first codeword; and
decoding, in the second transmission time interval, the code blocks related to the third codeword based at least in part on receiving the third codeword and decoding the retransmission of the corresponding code blocks related to the first codeword on the second transmission time interval based at least in part on the decoded partition information associated with the corresponding code blocks related to the first codeword.

12. The method of claim 1, further comprising:
setting one bit associated with the second indicator of the lowest decoding level, wherein a value of the one bit identifies the lowest decoding level associated with the code blocks for which the decoding procedure was unsuccessful.

13. The method of claim 12, wherein the one bit is set to indicate the lowest decoding level of the plurality of decoding levels, and wherein the plurality of decoding levels comprise two decoding levels.

14. The method of claim 1, further comprising:
transmitting, to the base station, an indication of a capability of the UE to support hierarchical acknowledgement feedback and a number of hybrid automatic repeat request processes across the plurality of decoding levels, wherein receiving the retransmission of the codewords of the lowest decoding level and new codewords associated with all other decoding levels is based at least in part on the capability of the UE; and
transmitting, to the base station, an indication of a capability of the UE to support a maximum number of hierarchical hybrid automatic repeat request buffers associated with the number of hybrid automatic repeat request processes.

15. The method of claim 1, wherein the retransmission of codewords of the lowest decoding level comprises retransmission of all corresponding code blocks related to the lowest decoding level, wherein the corresponding code blocks are included in corresponding code blocks group.

16. The method of claim 1, wherein the UE is configured to support multi-level coding with a multi-level sequential demodulation and decoding scheme.

17. A method for wireless communication at a base station, comprising:
transmitting, to a user equipment (UE) and in a first transmission time interval, a code block group comprising a plurality of code blocks associated with a plurality of codewords, each codeword of the plurality of codewords associated with one of a plurality of decoding levels of a decoding procedure for the code block group;
receiving, from the UE, a feedback message comprising a first indicator that a decoding procedure was unsuccessful for the code block group and a second indicator of a lowest decoding level of one or more codewords for which the decoding procedure was unsuccessful, the lowest decoding level being one of the plurality of decoding levels, wherein the decoding procedure comprises decoding at least a first decoding level associated with a first coding rate of the plurality of decoding levels prior to a second decoding level associated with a second coding rate, and wherein the first coding rate is a lower decoding level than the second coding rate; and
transmitting, to the UE in a second transmission time interval and based at least in part on the received feedback message, a retransmission of corresponding code blocks included in the code block group and corresponding to a codeword of the lowest decoding level.

18. The method of claim 17, further comprising:
determining that a decoding procedure of one or more code blocks associated with a first codeword is successful and a decoding procedure of one or more code blocks associated with a second codeword is unsuccessful, wherein the first codeword is associated with the first decoding level comprising the lower decoding level of the plurality of decoding levels and the second codeword is associated with the second decoding level comprising a higher decoding level of the plurality of decoding levels.

19. The method of claim 18, further comprising:
transmitting, to the UE, a control message responsive to the feedback message comprising the second indicator indicating that the decoding procedure associated with the second codeword is unsuccessful, the control message comprising a retransmission indicator for the corresponding code blocks associated with the second decoding level and a new data indicator, wherein the new data indicator is associated with one or more decoding levels lower than the second decoding level.

20. The method of claim 19, further comprising:
transmitting, to the UE and in the second transmission time interval, code blocks associated with a third codeword based at least in part on the decoding procedure associated with the first codeword being successful in the first transmission time interval, wherein the new data indicator comprises an indication of the third codeword associated with the first decoding level and corresponding code blocks; and
receiving, from the UE, a second feedback message indicating that a decoding procedure associated with the third codeword is successful.

21. The method of claim 19, further comprising:
including a hybrid automatic repeat request process number and a redundancy version associated with the second codeword in the retransmission indicator, wherein transmitting the retransmission of the codeword of the lowest decoding level comprises transmitting retransmission of the corresponding code blocks of the second codeword.

22. The method of claim 19, wherein the control message comprises a downlink control information.

23. The method of claim 17, further comprising:
determining that a decoding procedure associated with the corresponding code blocks of a first codeword is unsuccessful, wherein the first codeword is associated with the lowest decoding level of the plurality of decoding levels; and transmitting, to the UE, a control message responsive to the feedback message comprising the second indicator indicating that the decoding procedure associated with code blocks corresponding to the codeword of the lowest decoding level is unsuccessful, the control message comprising a retransmission indicator and a new data indicator, wherein the retransmission indicator indicates the retransmission of the corresponding code blocks associated with the first codeword and the new data indicator comprises an indication of a third codeword and corresponding to it code blocks associated with a second decoding level.

24. The method of claim 17, further comprising:
receiving, from the UE, an indication of a capability of the UE to support hierarchical acknowledgement feedback and a number of hybrid automatic repeat request processes across the plurality of decoding levels, wherein transmitting the retransmission of codewords of the lowest decoding level and new codewords associated with all other decoding levels is based at least in part on the capability of the UE; and
receiving, from the UE, an indication of a capability of the UE to support a maximum number of hierarchical hybrid automatic repeat request buffers associated with the number of hybrid automatic repeat request processes.

25. The method of claim 17, wherein the retransmission of codewords of the lowest decoding level comprises retransmission of all the corresponding code blocks associated with a codeword of the lowest decoding level, wherein the corresponding code blocks are included in corresponding code blocks group.

26. An apparatus for wireless communication at a user equipment (UE), comprising:
a processor,
memory coupled with the processor; and
instructions stored in the memory and executable by the processor to cause the apparatus to:
receive, from a base station in a first transmission time interval, a code block group comprising a plurality of code blocks associated with a plurality of codewords, each codeword of the plurality of codewords associated with one of a plurality of decoding levels of a decoding procedure for the code block group;
determine that the decoding procedure associated with one or more code blocks of the plurality of code blocks included in the code block group and associated with codewords of the plurality of codewords is unsuccessful, wherein the decoding procedure comprises decoding at least a first decoding level associated with a first coding rate of the plurality of decoding levels prior to a second decoding level associated with a second coding rate, and wherein the first coding rate is a lower coding rate than the second coding rate;
transmit, to the base station, a feedback message comprising a first indicator that the decoding procedure was unsuccessful for the code block group and a second indicator of a lowest decoding level of the one or more code blocks for which the decoding procedure was unsuccessful, the lowest decoding level being one of the plurality of decoding levels; and
receive, from the base station in a second transmission time interval and based at least in part on the transmitted feedback message, a retransmission of code blocks included in the code block group and corresponding to a codeword of the lowest decoding level.

27. The apparatus of claim 26, wherein the instructions are further executable by the processor to cause the apparatus to:
determine that a decoding procedure of one or more code blocks associated with a first codeword is successful and a decoding procedure of one or more code blocks associated with a second codeword is unsuccessful, wherein the first codeword is associated with the first decoding level comprising the lower decoding level of the plurality of decoding levels and the second codeword is associated with the second decoding level comprising a higher decoding level.

28. The apparatus of claim 27, wherein the instructions are further executable by the processor to cause the apparatus to:
receive, from the base station, a control message responsive to the feedback message comprising the second indicator indicating that the decoding procedure associated with the second codeword is unsuccessful, the control message comprising a retransmission indicator for corresponding code blocks associated with the second decoding level and a new data indicator, wherein the new data indicator is associated with one or more decoding levels lower than the second decoding level.

29. The apparatus of claim 26, wherein the instructions are further executable by the processor to cause the apparatus to:
store a log likelihood ratio associated with the code blocks related to codeword of the lowest decoding level and a hybrid automatic repeat request process identifier, and an indication associated with a decoding level for which the decoding procedure was unsuccessful;
decode, in the second transmission time interval and based at least in part on receiving the retransmission of the code blocks related to codeword of the lowest decoding level, and decoding of the code blocks of the lowest decoding level using the stored log likelihood ratio; and
transmit, to the base station, a second feedback message indicating that a decoding procedure associated with the retransmission of corresponding code blocks related to the codeword of the lowest decoding level is successful after the retransmission.

30. An apparatus for wireless communication at a base station, comprising:
a processor,
memory coupled with the processor; and
instructions stored in the memory and executable by the processor to cause the apparatus to:
transmit, to a user equipment (UE) and in a first transmission time interval, a code block group comprising a plurality of code blocks associated with a plurality of codewords, each codeword of the plurality of codewords associated with one of a plurality of decoding levels of a decoding procedure for the code block group;
receive, from the UE, a feedback message comprising a first indicator that a decoding procedure was unsuccessful for the code block group and a second indicator of a lowest decoding level of one or more codewords for which the decoding procedure was unsuccessful, the lowest decoding level being one of the plurality of decoding levels, wherein the decoding procedure comprises decoding at least a first decoding level of associated with a first coding rate the plurality of decoding levels prior to a second decoding level associated with a second coding rate, and wherein the first coding rate is a lower coding rate than the second coding rate; and transmit, to the UE in a second transmission time interval and based at least in part on the received feedback message, a retransmission of corresponding code blocks included in the code block group and corresponding to a codeword of the lowest decoding level.

\* \* \* \* \*